(12) United States Patent
Schmidt

(10) Patent No.: US 8,959,870 B2
(45) Date of Patent: Feb. 24, 2015

(54) FLUID-ACTUATED TELESCOPING TOWER FOR SUPPORTING HEAVY LOADS

(75) Inventor: Phillip M. Schmidt, Geneva, OH (US)

(73) Assignee: Phillip M. Schmidt, Geneva, OH (US)

( * ) Notice: Subject to any disclaimer, the term of this patent is extended or adjusted under 35 U.S.C. 154(b) by 0 days.

(21) Appl. No.: 13/704,816

(22) PCT Filed: Jun. 24, 2011

(86) PCT No.: PCT/US2011/041816
§ 371 (c)(1),
(2), (4) Date: Dec. 17, 2012

(87) PCT Pub. No.: WO2011/163585
PCT Pub. Date: Dec. 29, 2011

(65) Prior Publication Data
US 2013/0091784 A1     Apr. 18, 2013

Related U.S. Application Data

(60) Provisional application No. 61/358,659, filed on Jun. 25, 2010, provisional application No. 61/420,376, filed on Dec. 7, 2010, provisional application No. 61/381,473, filed on Sep. 10, 2010.

(51) Int. Cl.
*E04B 1/00*     (2006.01)
*E04H 12/34*    (2006.01)
(Continued)

(52) U.S. Cl.
CPC .............. *E04H 12/34* (2013.01); *E04H 12/182* (2013.01); *F03D 11/04* (2013.01); *F05B 2240/9151* (2013.01); *Y02E 10/728* (2013.01)
USPC ................ 52/741.14; 52/115; 52/40; 52/118; 52/848; 52/849

(58) Field of Classification Search
CPC ....... E04B 1/34; E04B 1/3404; E04B 1/3412; E04B 1/34305; E04C 3/005; E04H 12/00; E04H 12/182; E04H 2012/00
USPC ..................... 52/40, 115, 118, 632, 848, 849, 52/745.02–745.04, 745.17, 745.18
See application file for complete search history.

(56) References Cited

U.S. PATENT DOCUMENTS 2,730,207 A * 1/1956 Hall ................................ 52/115
3,361,456 A * 1/1968 Durand .......................... 52/632
(Continued)

OTHER PUBLICATIONS

PCT/US11/41816 International Preliminary Report on Patentability and Written Opinion of the International Search Authority dated Jan. 10, 2013.

*Primary Examiner* — Mark Wendell
(74) *Attorney, Agent, or Firm* — Tucker Ellis LLP

(57) ABSTRACT

A fluid-actuated telescoping tower supporting an associated load at a height above an associated foundation includes a fluid barrier, first and second telescoping tubular tower sections, a fluid port configured to receive compressed fluid from an associated source into an interior space of the tower defined by the first and second tubular sections, and a fastening system for holding the first and second tubular sections in the extended position with the compressed fluid received in the interior space of the tower and for mechanically connecting the first and second tubular sections in the extended position with the compressed fluid exhausted from the interior space of the tower by the fluid port. A method of erecting a tower includes inflating nested first and second telescoping tubular tower sections, fastening the sections in an extended position, and depressurizing the tower. A method of collapsing uses a reversal of the erecting process.

20 Claims, 15 Drawing Sheets

(51) Int. Cl.
*E04H 12/18* (2006.01)
*F03D 11/04* (2006.01)

(56) References Cited

U.S. PATENT DOCUMENTS

| | | | |
|---|---|---|---|
| 3,606,713 A | 9/1971 | Runquist | |
| 3,874,136 A * | 4/1975 | Michel | 52/118 |
| 3,958,376 A | 5/1976 | Campbell | |
| 4,040,217 A * | 8/1977 | Cloup | 52/632 |
| 4,663,900 A | 5/1987 | Rehm et al. | |
| 5,333,422 A * | 8/1994 | Warren et al. | 52/115 |
| 5,850,713 A * | 12/1998 | Hojo | 52/115 |
| 6,046,706 A * | 4/2000 | Vargas | 343/883 |
| 2004/0169376 A1 | 9/2004 | Ruer | |
| 2005/0005562 A1 | 1/2005 | Henderson | |
| 2010/0102557 A1 | 4/2010 | Ulanovskiy | |
| 2012/0159875 A1* | 6/2012 | Meyer et al. | 52/115 |

* cited by examiner

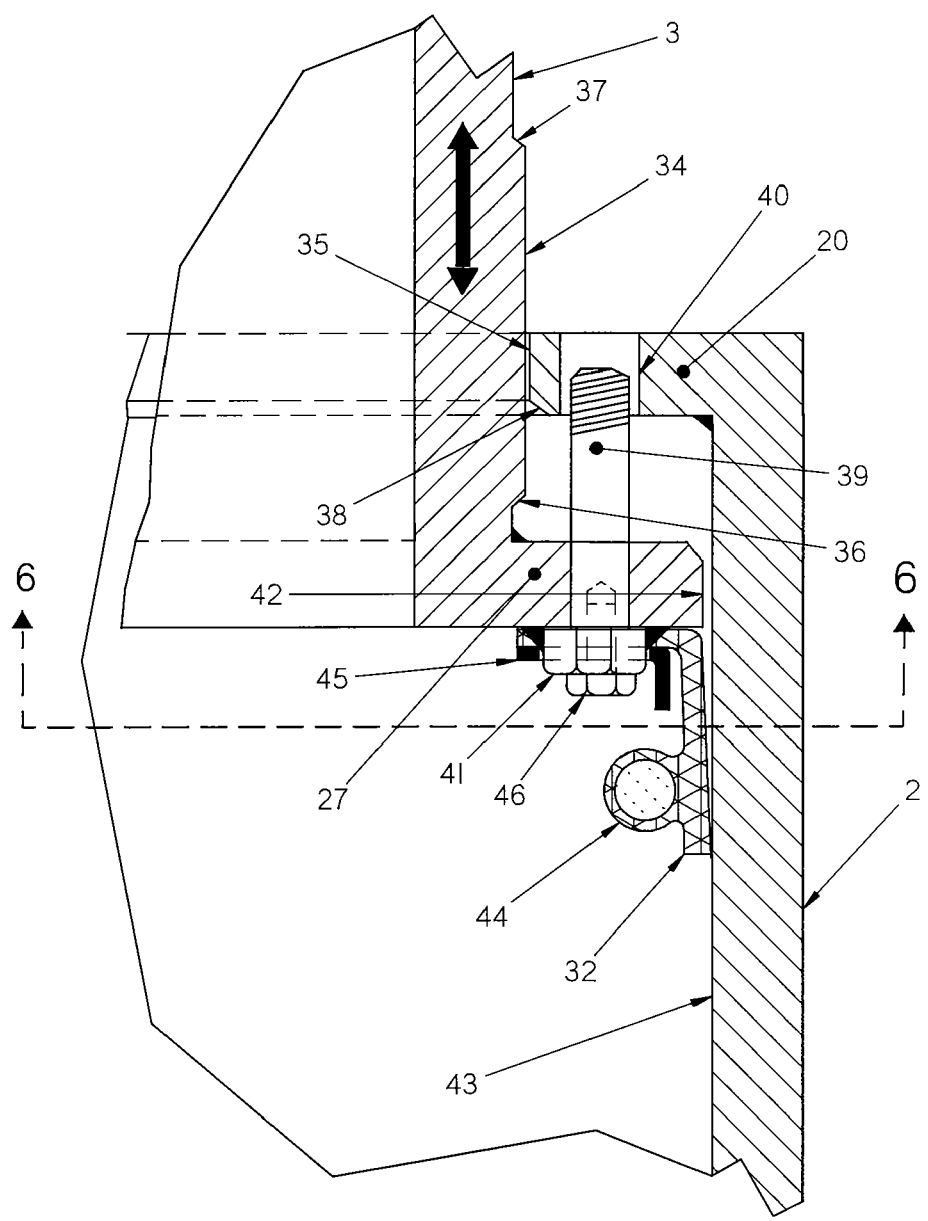

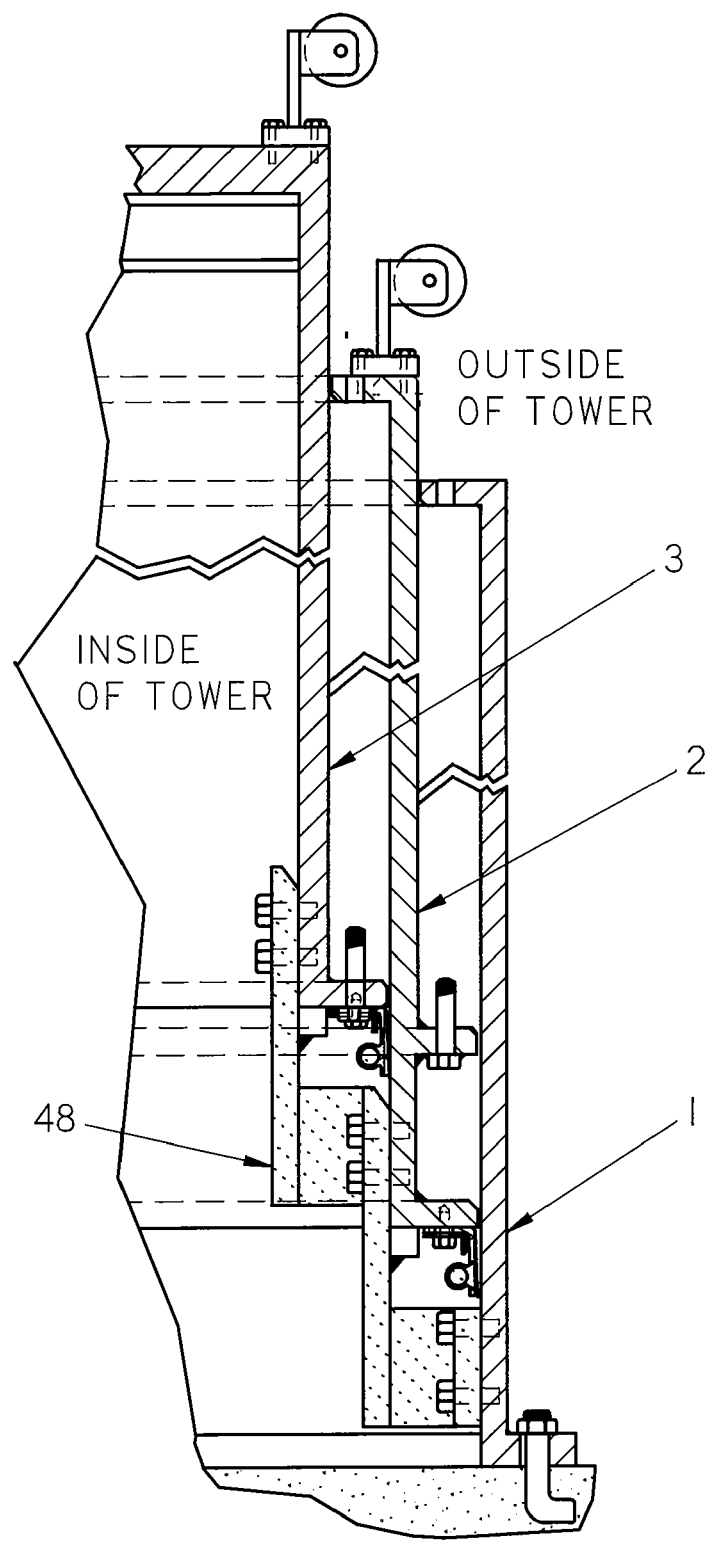

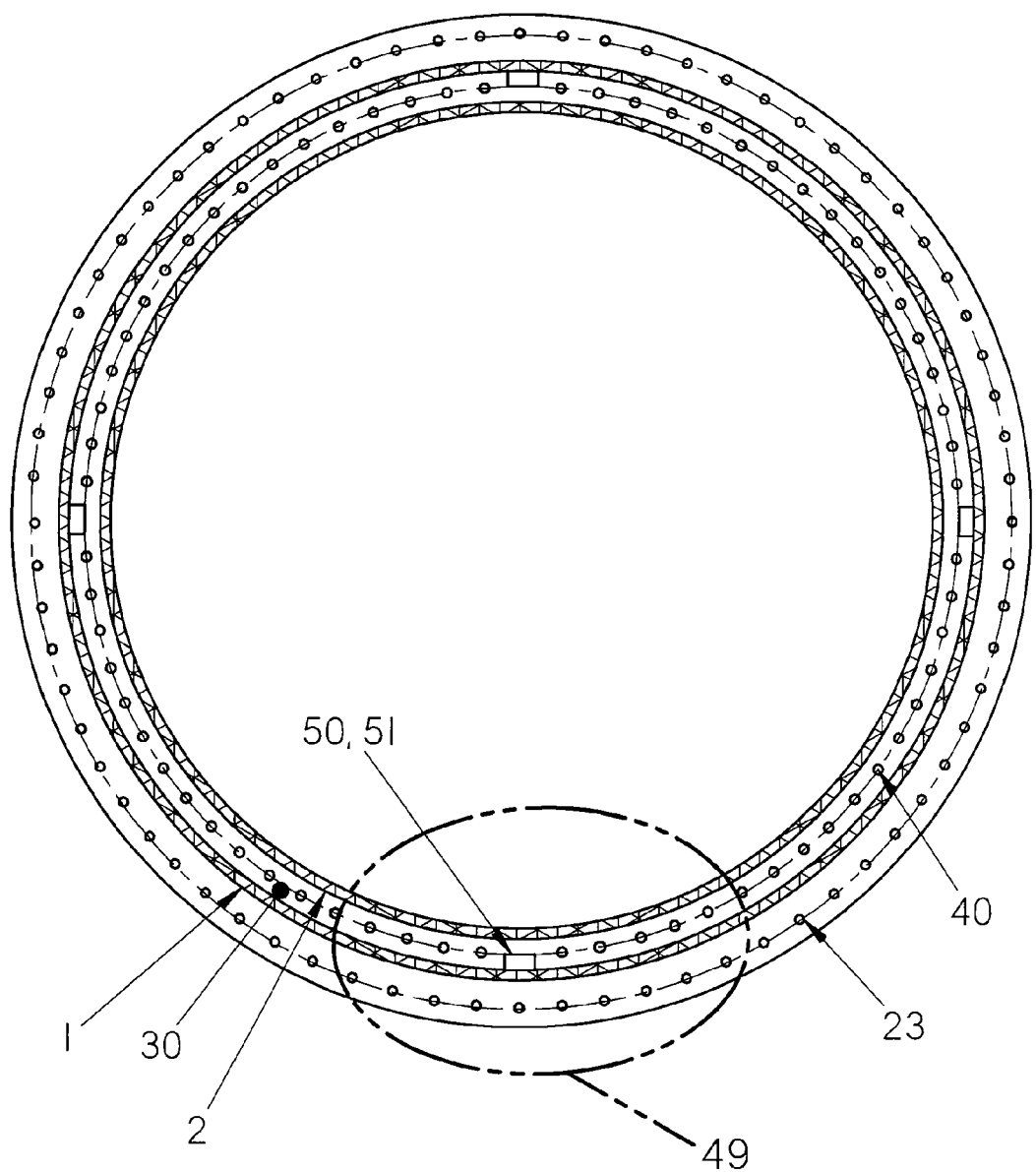

FLUID-ACTUATED TELESCOPING TOWER FOR SUPPORTING HEAVY LOADS

CROSS-REFERENCE TO RELATED APPLICATIONS

This application is a U.S. national phase application of International Application No. PCT/US11/41816, having international filing date of Jun. 24, 2011, which is based on and claims priority to U.S. provisional patent application Ser. No. 61/358,659 filed Jun. 25, 2010, U.S. provisional patent application Ser. No. 61/381,473 filed Sep. 10, 2010, and U.S. provisional patent application Ser. No. 61/420,376 filed Dec. 7, 2010, the collective teachings of which are included herein by reference.

FIELD OF THE INVENTION

Embodiments of the present invention relate to large, tall towers used to support various types of loads and, more particularly, to large tall wind turbine towers comprised of multiple telescopic sections vertically extendable by temporary internal tower pressure wherein the sections may be mutually fastened in an extended position and thereafter the pressure source removed. The embodiments also find application in connection with supporting other loads overhead including, for example, machinery and devices such as for example wind turbine generators, tower cranes, communications equipment, and advertising signs at substantial heights above the ground.

BACKGROUND

The embodiments described herein are particularly well suited for use in, and offer very significant benefits to, the rapidly developing wind power industry. The United States and other nations throughout the world are striving to develop ways of producing electrical power from sources other than fossil fuels, and one of the most popular alternatives is to utilize wind energy to drive wind turbine generators. Unfortunately the present state of the art of generating electrical power from wind energy is such that in many parts of the world, and particularly in the United States, wind power is not economically competitive with the more traditional methods of generating power from fossil fuels. It is believed that for wind power to become widely utilized, methods must be developed to reduce the cost per unit of electrical power generated to where it is equal to, or less than, that resulting from the use of fossil fuels. One way of accomplishing this is to find a way of more economically erecting the wind turbine generators at the desired high elevations where the winds are more ideal and the turbines perform more effectively.

The embodiments of the present invention described herein provide methods and apparatus that make the erection, use, and maintenance of large high towers more efficient and for some selected applications possible when they might otherwise not be possible.

Windmills and various types of wind turbines have been used for many years to pump water, generate electricity and provide power for numerous other purposes. Initially these windmills and turbines were typically mounted at the top of lattice types of towers, which were usually built from straight structural steel members assembled into a configuration having a rectangular cross section and four legs on the outside corners that extended from the ground to the top of the tower. Various types of horizontal and diagonal braces were used to stabilize the column-like legs so they would stay straight and not buckle in side-ways directions. Lattice types of towers are frequently seen in photographs or paintings of windmills on farms in the late 1800s and early 1900s.

U.S. Pat. No. 133,017 discloses a telescoping lattice type signal tower for use in elevating a human observer or signal-man in a basket-like apparatus fixed to the top of the tower. The tower was actuated, or extended upward through a system of cables and pulleys. The cables and pulleys are burdensome and add overall cost to the system.

Small telescoping towers that were extended upward by filling them with compressed air are disclosed in U.S. Pat. No. 1,264,063 wherein mast consisting of telescoping round tubes is used for hoisting telecommunications antennas to relatively low heights. Masts of this type are clearly not suitable for elevating large heavy objects to high heights. In addition, the tower described therein required shrouds, or guy wires, to provide the tower with side ways stability. More importantly, the mast required continuous pressurization throughout the time it was to be extended.

Another telescoping tower that was extended by compressed air is described in U.S. Pat. No. 1,325,053. It was primarily for use on submarines, required continuous air pressure throughout the time it was extended, and was obviously made by utilizing precisely machined components and was thus difficult and expensive to manufacture and use.

U.S. Pat. No. 4,137,535 discloses a telescoping antenna mast that was operated by pneumatic, or air, pressure. This mast is lightweight and is obviously not suited or adaptable for elevating large equipment such as a wind turbine or the like. Further, no provisions are described for securing the sections in the extended position once extended such as by fastening, and the telescoping antenna requires continuous air pressure throughout the time it is extended, the sections appear to be fully machined, and the tower is not strong enough to withstand the lateral and bending loads imposed by large wind turbines.

U.S. Pat. No. 6,955,025 discloses a tower that is hinged at mid-height and required a large, very expensive crane to unfold it outward and upward until it was straight up and down and is therefore not self-erecting.

U.S. Pat. No. 4,594,824 describes a lightweight tower that is not designed or suited for elevating large heavy equipment such as a wind generator. It requires expensive machining, and there are no provisions for bolting or otherwise securing the sections together after they are extended, wherein air pressure must be continuously supplied to maintain the tower in an elevated conformation. The bottom portion of the various sections are without rigidity such as would be necessary for the tower to have the lateral bending resistance required for wind tower use.

The current state of the art in wind generator towers is a tower consisting typically of three cylindrical sections, each having a size of about 12 to 14-ft in diameter and about 90 feet long, either tapered or progressively smaller in diameter than the section below it, and weighing about 60 tons. These sections are lifted into place by a huge, extra-heavy lift crane and set on top of each other end to end and then bolted together. The typical wind turbine generator assembly weighs about 60 tons and is lifted up and set on top of the erected tower, typically at vertical elevations of about 300 ft high. This erection requires at least one extremely expensive, huge, extra-heavy lift crane. Such cranes are typically brought in sections to the tower erection site by 50 or more heavy-haul semi-trucks. The cost of buying, transporting, assembling and dismantling these cranes is extremely high. By eliminating the need for such cranes, the present invention greatly reduces the cost of erecting the tower and wind turbine generator, which in turn lowers the cost of producing electricity from wind energy and makes the widespread use of wind energy more likely in the near future.

U.S. Pat. No. 6,782,667 B2—Henderson, Aug. 31, 2004; and Patent Application Publication #US2005/0005562 A1—Henderson et al, Jan. 13, 2005 clearly illustrate the great cost of using the extra-heavy lift cranes to erect large wind turbine generators. These represent attempts to advance the state of the art in wind towers by constructing the towers of telescoping sections, and in the case of U.S. Pat. No. 6,782,667 by also hinging the bottom end of the lower section and tilting the towers up into a vertical configuration after nesting the sections in the horizontal position. In the second case, a lift mechanism interconnecting the sections is needed, and the erection method cited begins with mounting the outer lower section on the foundation whereas the assembly sequence for the present invention begins with setting the innermost section on the foundation and setting the outer section last.

U.S. Pat. No. 6,470,645 issued Oct. 29, 2002 to Maliszewski relates to wind towers that are designed with thicknesses and braces including a conical transitional section between the upper and lower sections in such a way as to diminish certain vibrational characteristics that can threaten the strength of the tower. Like the other types of wind towers typically being used today, these towers also require a huge, very expensive extra-heavy lift crane to erect them.

Several types of "hybrid" wind towers have been disclosed such as in U.S. Pat. Nos. 7,276,808 and 7,694,473 for example, with the primary feature of these towers being the use of a larger diameter lower section of the tower that is made of concrete or a lattice type of structure. A more typical steel wind tower is then normally set on top of, and attached to, the lower base section in order to have a tower that goes higher into the air than a totally steel tower can. Totally steel towers that are higher than about 290 feet are not economical to produce since in order to have adequate strength the walls must be made extra thick if the maximum diameter at the bottom is maintained at 14 ft. so they can be shipped by truck or rail. Again, a huge, very expensive extra-heavy lift crane is required to erect the hybrid towers. Also, it should be noted that the telescoping air-extended tower of the present invention is fully compatible with the hybrid types of towers.

Although the previously discussed patents and other published developments show the art relating to the design and construction of large, tall towers used to support machinery and devices such as wind turbine generators, tower cranes, communications equipment and advertising signs at substantial heights above the ground includes towers that telescope and small telescoping pneumatic towers that are maintained in an extended position by a continuous source of injected pressurized air applied to the tower, the art does not teach, suggest or disclose large, tall, telescoping towers for supporting big, heavy items such as wind turbine generators such as the tower described herein that can be extended to its full height simply by pumping compressed fluid such as water, air or a mixture of water and air into its interior, maintaining such pressure only until the tower sections are mechanically or otherwise secured, and then returning the interior of the tower to normal atmospheric pressure. The art further fails to teach, suggest or disclose an ability to lower such a tower and the load it supports simply by reversing the procedure used to erect it. The methods of making and using the self-erecting tower and the embodiments of the tower described in connection with example embodiments make it unnecessary to use a huge, extra-heavy lift crane, or cables and winches, hydraulic cylinders, jacks, or other types of mechanical devices to construct or erect the tower to its full height, or lower its load after the tower has been erected.

SUMMARY OF THE EXAMPLE EMBODIMENTS

Embodiments of the present invention are useful and beneficial in many situations where a heavy device, piece of machinery or other type of object must be elevated to, and maintained for long periods at, a high elevation above ground level. In particular, the embodiments of the present invention simplify the construction and erection of tall towers for supporting wind turbine generators and other big, heavy items such as tower cranes, communications equipment and advertising signs by providing a tower that can be erected simply by pumping compressed fluid into its interior, thereby making it unnecessary to use a huge and very expensive extra-heavy lift crane, or cables and winches, hydraulic cylinders, jacks, or other types of cumbersome and labor-intensive mechanical devices to construct the tower to its full height.

In accordance with an embodiment, a fluid-actuated telescoping tower for supporting an associated load at a selected height above an associated tower foundation is provided. The tower includes a fluid barrier, a first tubular tower section coupled on one end thereof and in closed fluid communication with the associated tower foundation, and a second tubular tower section coupled on one end thereof and in closed fluid communication with the associated load and being telescopically received in the first tubular tower section forming a nested retracted arrangement oriented in a generally vertical position, the first and second tubular tower sections being mutually fluid-tight by the fluid barrier when so nested and throughout relative axial movement between the first and second tower sections between opposite retracted and extended positions. A fluid port is configured to receive compressed fluid from an associated source of compressed fluid into an interior space of the tower defined by the first and second tubular sections thereby urging relative motion between the first and second sections from the retracted relative position to the extended relative position to effect relative vertical movement of the associated load relative to the associated foundation raising the associated load to the selected height. Fastening means comprising fasteners are provided for selectively holding the first and second tubular sections in the extended position with the compressed fluid received in the interior space of the tower. The fastening means are further provided for mechanically connecting the first and second tubular sections in the extended position with the compressed fluid exhausted from the interior space of the tower by the fluid port.

In accordance with a further embodiment, a method of erecting a telescoping tower structure is provided for supporting an associated load operatively coupled with a first end of the tower structure at a selected vertical height above an associated tower foundation operatively coupled with a second end of the tower structure opposite from the first end. The method includes the steps of disposing a plurality of tower structure sections in a retracted nested arrangement wherein central longitudinal axes defined by the plurality of tower structure sections are substantially mutually coextensive, coupling a first end of an outermost tower structure section of the retracted nested arrangement with the associated tower foundation in a vertical orientation, coupling a first end of an innermost tower structure section of the retracted nested arrangement with the associated load, receiving compressed fluid into the retracted nested arrangement, establishing relative vertical movement between the innermost and outermost tower structure sections by the compressed fluid thereby raising the associated load relative to the associated tower foundation, arresting the relative vertical movement between the innermost and outermost tower structure sections at a selected relative extended position between the innermost and outermost tower structure sections, forming the plurality of tower structure sections in a first extended nested arrangement by rigidly coupling a second end of the innermost tower structure section opposite the first end with an end of a next inner tower structure section, and exhausting the compressed fluid from the first extended nested arrangement.

In accordance with yet a further embodiment, a structure is provided for supporting an associated load relative to an associated base member The structure comprises a first cylindrical member defining a first space and being supported on a first end thereof by the associated base member; a second cylindrical member having a first end telescopically received in the first cylindrical member and defining a second space, the second cylindrical member being configured on a second end thereof to selectively couple with the associated load; a fluid coupling configured to provide a fluid tight coupling between the first and second cylinders; a port on at least one of the first and second cylindrical members, the port being configured for communicating compressed fluid between an associated source of compressed fluid and the first and second spaces, whereby the second cylindrical member is selectively urged into telescopic movement between extended and retracted positions relative to the first cylindrical member; and, fastener interlock means for selectively fixing the second member in the extended position relative to the first cylindrical member.

In accordance with still yet a further embodiment, a method is provided for extending a structure including a first cylindrical member defining a first space and being supported on a first end thereof by the associated base member, a second cylindrical member having a first end telescopically received in the first cylindrical member and defining a second space, the second cylindrical member being configured on a second end thereof to selectively couple with the associated load; providing a fluid coupling configured to provide a fluid tight coupling between the first and second cylinders; a port on at least one of the first and second cylindrical members, the port being configured for communicating compressed fluid between an associated source of compressed fluid and the first and second spaces, whereby the second cylindrical member is selectively urged into telescopic movement between extended and retracted positions relative to the first cylindrical member; selectively fixing by fastener interlock means the second member in the extended position relative to the first cylindrical member, the method comprising: filling the first and second spaces with compressed fluid; fixing the first and second cylindrical members in the extended position using the fastener interlocks; and, releasing the compressed fluid from the first and second spaces.

In accordance with another embodiment, a method is provided for controlled collapsing a structure including a first cylindrical member defining a first space and being supported on a first end thereof by the associated base member; a second cylindrical member having a first end telescopically received in the first cylindrical member and defining a second space, the second cylindrical member being configured on a second end thereof to selectively couple with the associated load; a fluid coupling configured to provide a fluid tight coupling between the first and second cylinders; a port on at least one of the first and second cylindrical members, the port being configured for communicating compressed fluid between an associated source of compressed fluid and the first and second spaces, whereby the second cylindrical member is selectively urged into telescopic movement between extended and retracted positions relative to the first cylindrical member; and, fastener interlock means for selectively fixing the second member in the extended position relative to the first cylindrical member, the method comprising: filling the first and second spaces with compressed fluid; freeing movement between the first and second cylindrical members in the extended position by releasing or removing the fastener interlocks to decouple the first and second cylindrical members; and, controlledly releasing the compressed fluid from the first and second spaces.

BRIEF DESCRIPTION OF THE DRAWINGS

The drawings described herein are for purposes of illustration only and are not intended to limit the scope of the present disclosure in any way. The present invention will become more fully understood from the detailed descriptions and accompanying drawings wherein:

FIGS. 3A and 3B are selected enlarged portions of the tower of FIG. 3;

FIG. 4 is a cross-sectional view of a selected portion of a tower in accordance with an embodiment;

FIG. 5 is a cross-sectional view taken through line 5-5 of FIG. 1B showing preferred bolt hole locations for flange-to-flange connections in accordance with an embodiment, and a preferred location of an anti-reversing rack and pawl system in accordance with an embodiment for preventing the tower sections from sliding downward in the event of a drop in fluid pressure after the erection process has started;

DESCRIPTION OF THE EXAMPLE EMBODIMENTS

Figure 1:
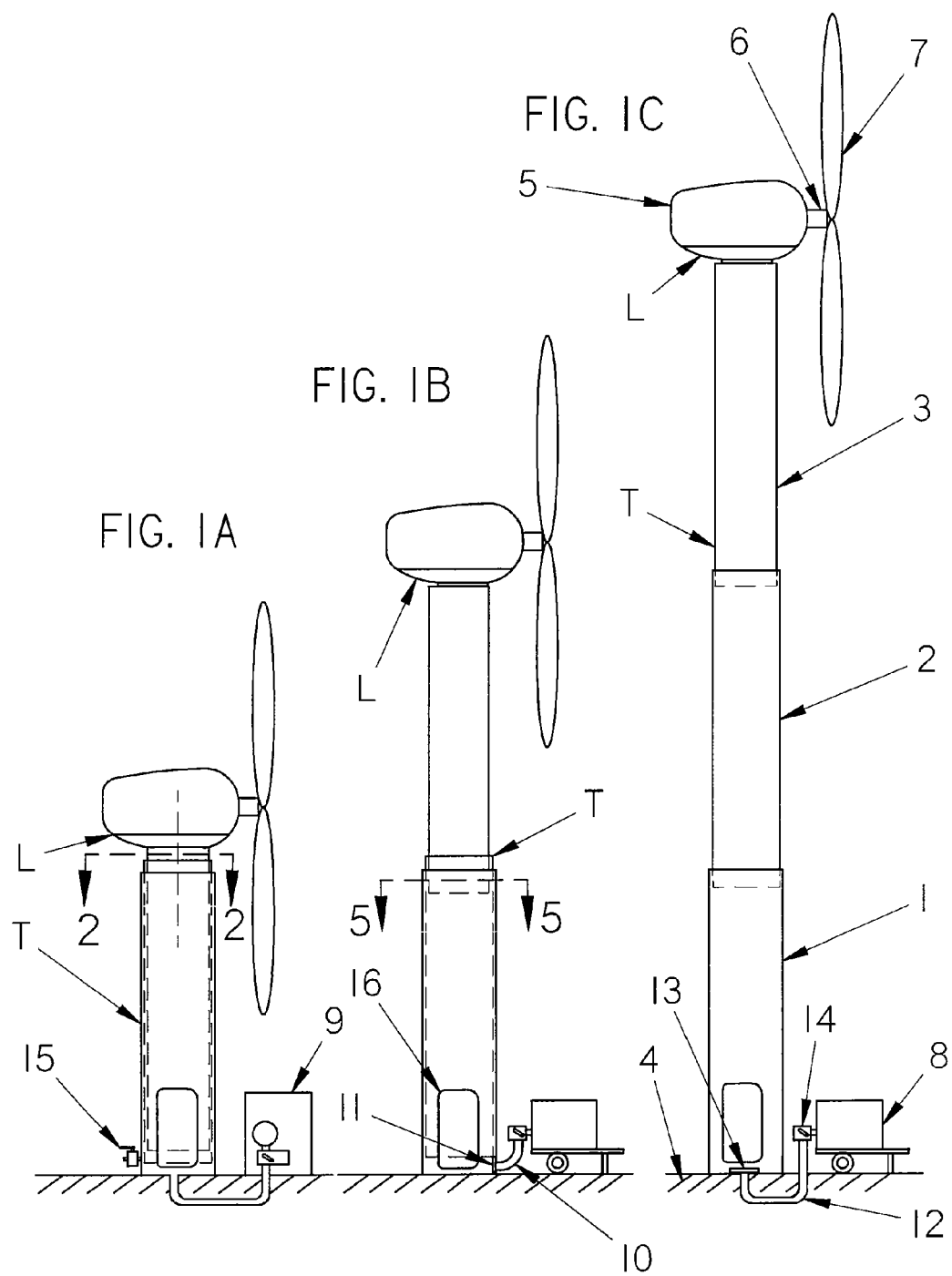
FIGS. 1A, 1B, and 1C show side elevation views of an erection and elevation sequence of a fluid-actuated telescoping tower in accordance with an example embodiment.

Although a preferred embodiment and a means and method of extending the tower of this invention by introducing compressed fluid into it are herein explained in detail, it is to be understood that the embodiments and any alternatives are presented only for way of illustration, and it is not intended that the invention be limited in scope to the details or method of construction, sequences, components, or the arrangement of components as presented or illustrated in the following description. It is further to be understood that in describing the preferred embodiment the terminology used is intended for maximum clarity and that each term used includes all technical equivalents that operate in a similar manner to accomplish a similar purpose.

For purposes of the present application, "fluid" is to be understood to include any substance or mixture that can flow including mixtures of liquids and/or gases. Also, for purposes of the present application, "air" is to be understood to include mixtures of air with other gases, other gases (for example $CO_2$ or an inert gas such as argon), or any of these in combination, or any of these in combination with a mist additive such as for example an oil additive mist. Further, for purposes of the present application, "water" is to be understood to include fresh or salt water or any mixtures of fresh or salt water with any other one or more flowable liquids.

The tower methods and apparatus of the embodiments of the present invention can be fabricated in the form of multiple independent tubular tower sections and brought to the job site in much the same manner as presently used towers, except for small changes such as adding provisions for making the tower relatively fluid-tight and to insure the erection process will be safe and efficient. If desired, the embodiments can also be fabricated in longitudinal full-length subassemblies that can be shipped to the job site and then joined together by bolting, welding or by some other way into the independent tubular tower sections. The number of sections can be as few as two, or as many as required to best meet the requirements of a particular situation. For most large wind turbine generator support towers the number would typically be either three or four.

An initial step of the tower erection process is to ensure all the equipment and hardware that is too large to be brought into the tower after it is erected is placed within the tower's foundation and located so it will not pose problems during the rest of the erection process. Components such as bus bars, stairs, platforms and hoists can be attached (either permanently or temporarily) to the inside of the upper tower section, but essentially nothing can be attached to the inside of any one of the other sections until after the section that is normally above it has been fully elevated and the two sections securely connected together.

A next step of the erection process is to position the tower sections one inside another at the center of the tower foundation, on end, with the top end of each section up. This can be accomplished in various ways, ranging from (a) setting them in place with a fairly large truck crane, or (b) nesting them inside each other while they are laying horizontally on the ground and then tipping them up on end all together at the same time, or (c) if they come to the job site as longitudinal full-length subassemblies they can be set on end in sequence around each other and then joined together by bolting or welding. Although not essential, guide rollers, smooth plates or air bearings can be temporarily or permanently attached to the tower sections to assist in getting them inside of each other, whether they are lowered vertically into each other or slid inside each other when horizontal. Once the sections are nested the guide rollers can be removed. They are not needed to extend or lower the tower sections. Further, it is not necessary to have the bottom of any of the tower sections hinged in order to lift them from the horizontal position to a vertical position—properly designed lifting and handling fixtures and a crane with adequate capacity are all that's necessary.

After all the sections are in the proper position the section with the largest diameter (i.e., the one that is the lowermost section of the assembled tower) is attached to the foundation and the joint sealed so little or no air can escape through the interface. Then the tower's payload, for example a wind turbine generator package, often called the nacelle, is attached to the top of the innermost section of the tower (i.e., the one that is the uppermost section of the tower). Depending on the lengths of the various tower sections it may be necessary or desired to block under this upper section so it is elevated sufficiently to ensure the nacelle or other type of payload will clear the tops of all the other sections when it is attached. Alternately, the upper section can be designed to be a little longer than the other sections of the tower.

If the payload is a wind generator, after the nacelle is securely attached, temporary closure plates and other types of devices may be installed in order to seal the top end of the upper section so little or no compressed fluid can escape through the top of the section when fluid is pumped into the tower during the elevating stage of the erection process. The shaft hub assembly is installed next, (unless this was done before the nacelle was attached to the top of the upper section) and then the turbine blades, if they were not attached when the hub assembly was installed.

At this point any erection-related components not yet in place should be installed, along with any other components desired to be in place before the tower is erected, and all components carefully inspected. All of the tower sections, all the components in the nacelle and hub, and each of the blades should have already been fully inspected.

The tower is now ready to be pressurized and telescopically extended to its final elevated position, or maximum vertical height. This is the elevating stage of the erection process and it begins when one or more large fluid compressors or pumps start pumping compressed fluid into the interior of the tower. The fluid typically flows from the compressor through large hoses or pipes and enters the tower through either a hole in the sidewall of the lower tower section, or through an passageway constructed under the tower foundation that discharges the fluid through a hole in the floor of the tower. A plate, hinged on one side, can be used as a "flapper" check valve to prevent the rapid loss of fluid pressure in the tower if a major break should occur in the fluid supply line coming from the compressor. Use of such a plate as a check valve necessitates providing a means of depressurizing the tower if the plate has so much pressure holding it closed that it cannot be opened in the usual manner.

For offshore, inland lake or any other installations adjacent a readily available source of water, the fluid pump may selectively draw from the water source for filling the tower during the elevating stage of the erection process. Once filled, the water may be returned to its source by draining the erected tower or by any other suitable means or methods.

When the tower is being pressurized with a fluid such as air or water there is no concern about some of it leaking out of the tower. The fluid that escapes is not harmful to the environment, it makes no objectionable mess and as long as the volume of fluid entering the tower is greater than the amount leaking out the fluid pressure inside the tower will continue to increase. When the pressure becomes high enough, the top, or innermost tower section, will begin to move upward and continue to do so as additional amounts of fluid are pumped into the tower.

This movement results from the fact that the pressure from the fluid pushes outward on all the interior surfaces of the tower equally in all directions, but not all parts of the tower are free to move. When the pressure pushes on the sidewalls of the tower sections it exerts just as much force on one side of the tower as it does on the directly opposite side, but the two sides cannot move away from each other so the pressure in the tower does not cause the tower to move in any sideways direction. However, while the pressure is pushing upward on the inside surface of the top of the upper tower section, the pressure pushing in a downward direction is pushing on the floor of the tower. Since the upper tower section is not connected to the floor it is free to slide upward when the upward force of the compressed fluid begins to exceed the combined weight of the upper section of the tower and anything attached to it, such as the nacelle, hub and blades, stairs, bus bars, etc. This upward force can be calculated by multiplying the number of square inches of surface area that the fluid pressure is pushing against times the pressure being applied to every square inch of that surface. For a tower 10 feet in diameter a pressure of only 60 lbs per square inch will push upward with enough force to lift more than 678,585 lbs., or more than 339 tons. As additional fluid is pumped into the tower, the upper section will continue to move upward until it is fully extended relative to the section below it, and to which it is to be attached—typically by numerous large bolts.

The sections can be secured in place by other means than bolts. One alternate way being to use a sectional retaining ring that goes into a groove machined into the lower outside surface of the inner tower section when it is fully extended. The sections of the retaining ring are installed from the exterior of the tower and secured in place at the top end of the larger of the two tower sections being connected together.

If desired to ensure that any tower sections being elevated cannot slide or drop back down if there is a loss of fluid pressure, one or more, but typically four, "pawls" (often called "dogs") can be attached at approximately equal distances apart around the bottom end of each section to be elevated. Each pawl travels up with the tower section as it is being elevated, sliding along a notched steel bar called a "rack" that is attached to the inside of the tower section within which the section with the pawls is moving. Together the pawls and racks comprise a ratchet-like apparatus that allows the pawls to slide up the rack, but not down the rack. The finger-like pawls pivot, and they are typically either spring-loaded or shaped so the force of gravity causes one end of them to enter each notch in the rack as the pawl passes over it. If the pawl is traveling upward the pawl simply pivots and slides back out of the notch as it moves past it. However, if the direction of travel changes and the pawl starts to travel down the rack the pawl slides into the first notch it comes to and the notch is shaped so the pawl cannot come back out. Therefore the pawl is not able to go past any of the notches when moving in a downward direction, and once a section is partially or full elevated the pawls and racks will prevent it from coming back down if there is any drop in fluid pressure. The pawls can be controlled, however, and kept from entering the notches in the rack during downward movement. This allows the tower sections to be lowered if major repairs need to be performed on a turbine or some other large piece of equipment mounted at the top of the tower.

Once the upper section is tightly in place relative to the section to which it is to be attached, workers in bucket-truck workbaskets can safely work from outside the tower and quickly and easily install the bolts or other form of fasteners required to securely connect the two sections together. Bucket trucks with working heights exceeding 100 feet are readily available and their use eliminates any need for workers to go inside the tower before the sections are securely connected.

When the upper two sections have been completely and properly connected together, the fluid pressure in the tower is increased until the upward force becomes great enough to lift the additional weight of the newly attached section of the tower. The two combined sections and any payloads or items attached to them are then elevated until the second section can be connected to the top of the third section. If this third section is the bottom section of the tower the elevation stage of the erection process is thus completed. If there is one or more sections remaining to be elevated, the above described procedure is repeated until all sections are fully elevated and properly connected together, at which point the erection process is essentially completed other than relatively incidental "wrap-up" activities.

In an example embodiment of the present invention a tower structure is constructed having inside surfaces that are typically not precisely and smoothly machined, that slide inside of each other, and that can be extended to the point where the tower attains its full height simply by selectively internally pressurizing the tower structure from within sufficiently with compressed fluid such as air or water to urge the tower sections into telescopic extending motion. The material from which the tower of the embodiments is constructed can be steel, another type of metal, a non-metallic material such as reinforced plastic, carbon-epoxy, concrete, or a combination of materials.

In an example embodiment of the present invention a tower structure is constructed with special fluid barriers in the preferred form of seals that slide over the inside surfaces of the tower segments in such a manner that the fluid such as air or water within the tower is prevented, or restricted, from escaping as fluid from outside the tower is pumped into it by a fluid pump, or compressor. Such seals may not always be necessary or desired, however, depending on the degree of precision with which the tower is manufactured. If manufactured so only relatively small openings exist through which the compressed fluid can escape, the seals may not be necessary. As long as the fluid is pumped into the tower faster than it is able to escape the pressure within the tower increases, and when the amount of upward force resulting from the fluid pressure exceeds the weight of the tower sections and payload components to be elevated, the tower will begin to extend telescopically upward. As more and more fluid is pumped into the tower it will eventually become fully extended, at which point the sections are selectively mechanically fastened together to complete the erection process, and the fluid pressure is no longer needed to hold the tower up. The compressed fluid in the tower is then vented off and the pressure in the tower is permitted to return to normal atmospheric pressure. The associated fluid pump or compressor would typically then be disconnected and removed from the site. The tower can be re-pressurized and the erection process reversed by decoupling the mechanical fasteners after re-pressurizing, then permitting the pressure to gradually decrease if it becomes desirable to lower the tower down to the collapsed condition for maintenance or repair. In accordance with an advantage of the novel structures and methods described herein, no extra-heavy lift crane or any other devices or systems such as hydraulic cylinders, jacks, lead screws, cables or winches are required to extend or collapse the tower—only a large fluid pump or compressor. As a further note, if the water or air fluid leaks out, there is no mess or environmental concerns as typically the case with hydraulic oil—it just goes back into the atmosphere or ultimately into some large body of water.

Referring now to FIGS. 1A, 1B and 1C of the drawings, a telescoping tower T in accordance with an example embodiment is shown at three stages of an erection process in accordance with a further example embodiment. In general, FIGS. 1A, 1B, and 1C show side elevation views of an erection and elevation sequence of a fluid-actuated telescoping tower in accordance with an example embodiment, starting from a lowered and nested configuration with the nacelle and blade assembly attached (FIG. 1A) and then progressing through the elevation of the upper section (FIG. 1B) and ending with the tower fully extended to its maximum height above ground (FIG. 1C). The FIGURES also show locations and use of typical associated fluid compressor units and typical associated fluid delivery pathways for better understanding of the embodiments. The tower T is comprised of three sections designated by reference numbers 1, 2, and 3. Each of the tower sections has a cylindrical conformation, and preferably, a circular cylindrical conformation as shown. In addition, each of the cylindrical tower sections is substantially hollow for reasons which will become apparent below. Yet still further, each of the cylindrical tower sections defines a central longitudinal axis extending along a length thereof. In the collapsed orientation of the tower sections as shown in FIG. 1A, the plurality of central longitudinal axes are mutually coextensive. The tower T is secured on a bottom end to an associated foundation 4 and is configured to support an associated load L at an upper end opposite from the top end wherein, in the example embodiment illustrated, the associated load L consists of a wind turbine generator unit, or nacelle, 5 with a main shaft hub assembly 6 and a set of blades 7 to be driven by the wind. Although only three (3) sections are illustrated for ease of describing the example embodiment, it is to be appreciated that the subject fluid-actuated telescoping tower T could have as few as two (2) or any number of sections more than two (2) or three (3) sections as necessary or desired in accordance with various circumstances and applications. However, a three-(3) section tower has been selected for best describing the example embodiment.

FIG. 1A presents the tower in the first stage of erection, showing it in the collapsed, or fully lowered, position. At this stage all the tower sections 1, 2 and 3 are arranged or disposed in a relative nested orientation wherein the tower sections 1, 2, 3 have been nested inside of each other. The tower T in the position illustrated in FIG. 1A is secured in place to the associated foundation 4 such as by using bolts or other fasteners or the like, and, in addition, the nacelle 5 has been secured to the top of the uppermost and innermost tower section 3. The main shaft hub assembly 6 and blades 7 of the load L have been installed, and one or more associated large capacity fluid compressors, either portable 8 or permanently installed on site 9 have been connected to a large diameter fluid supply line 10 connecting to a hole 11 in the side of the tower, or a line 12 extending under the foundation 4 and connecting to a means for receiving an associated source of compressed fluid such as a hole 13 in the floor of the foundation. Pressurized fluid flow from the associated compressor and into and out of the inner space collectively defined by the telescopic sections of the tower T is controlled by a valve 14. An optional pressurized fluid exhaust means such as for example a venting valve 15 can be selectively provided and installed to selectively permit the controlled escape of pressurized air or pressurized fluid out of the tower in order to depressurize the space collectively defined by the tower sections 1, 2, 3 relative to the space outside of the tower T. A pressure-tight door 16 is selectively provided or otherwise formed in the side of the tower to enable workers to enter and leave the interior of the tower after the tower is depressurized and to bring in and take out equipment and components or for any other use as desired.

FIG. 1B shows the tower extended to the point where the uppermost, or top, section 3 is fully extended relative to the section in which it telescopes 2, and FIG. 1C shows the tower fully extended.

In the example embodiment illustrated, each of the tower sections 1, 2 and 3 includes an elongated, essentially cylindrical tubular member constructed typically by rolling or press brake forming and then welding numerous metal plates into ring-like subassemblies, and then welding them together end to end into a tube-like structure. In an embodiment for example, the ring-like subassemblies may be about 10 feet long, and the tube-like structure may typically be about 80 to 90 feet long. Appropriate flanges are suitably welded at or near each end of the tubular structure. The flanges are preferably drilled and machined as required to securely and efficiently connect the sections to each other after the tower T is erected into the position shown in FIG. 1C and to facilitate the attachment of various components such as fluid seals.

The assembly and erection process in accordance with the example embodiment illustrated begins after the associated foundation 4 has been constructed and all of the equipment and hardware that is too large to be brought into the tower through the door 16 is placed on the foundation 4 such that it will be inside the tower and located so it will not pose problems during the erection process. Components such as bus bars, stairs, platforms, and hoists can be attached either temporarily or permanently to the inside of the uppermost tower section, but essentially nothing can be attached to the inside of any one of the other sections until after the section that is normally above it has been fully elevated and the two sections securely connected together. The next step of the erection process is to nest, or position, the tower sections 1, 2 and 3 one inside another at the center of the tower foundation 4, on end, with the top end of each section up. The embodiments of the subject tower T are configured so both of these steps can be accomplished. In accordance with one example embodiment, these stops can be accomplished by lifting the smallest diameter, and innermost, section 3, temporarily securing it in place on the foundation 4, then lifting the next largest section 2 and lowering it down around the previously positioned section 3 and repeating this process until all sections of the tower are setting vertically on the foundation 4 in the collapsed position. In accordance with this example embodiment, the tower T is essentially built or staged vertically and growing the tower from the inside outwardly. In accordance with another or alternative example embodiment, a further method for building or staging the tower sections is accomplished by sliding, rolling or otherwise moving the individual tower sections 1, 2, 3 into one another while they are in an essentially horizontal orientation forming an overall horizontal nested tower section bundle, and then tipping one end of the combined sections together in the nested tower section bundle vertically upwardly onto the foundation so they are properly positioned and their longitudinal axes are in a vertical or skyward direction. The large open interior of the tower provides space for a large amount of equipment and hardware. It is to be appreciated that equipment such as stairways, platforms, bus bars are configured to telescope as the tower sections telescope or are otherwise configured to be compatible with the telescoping action of the tower.

Figure 2:
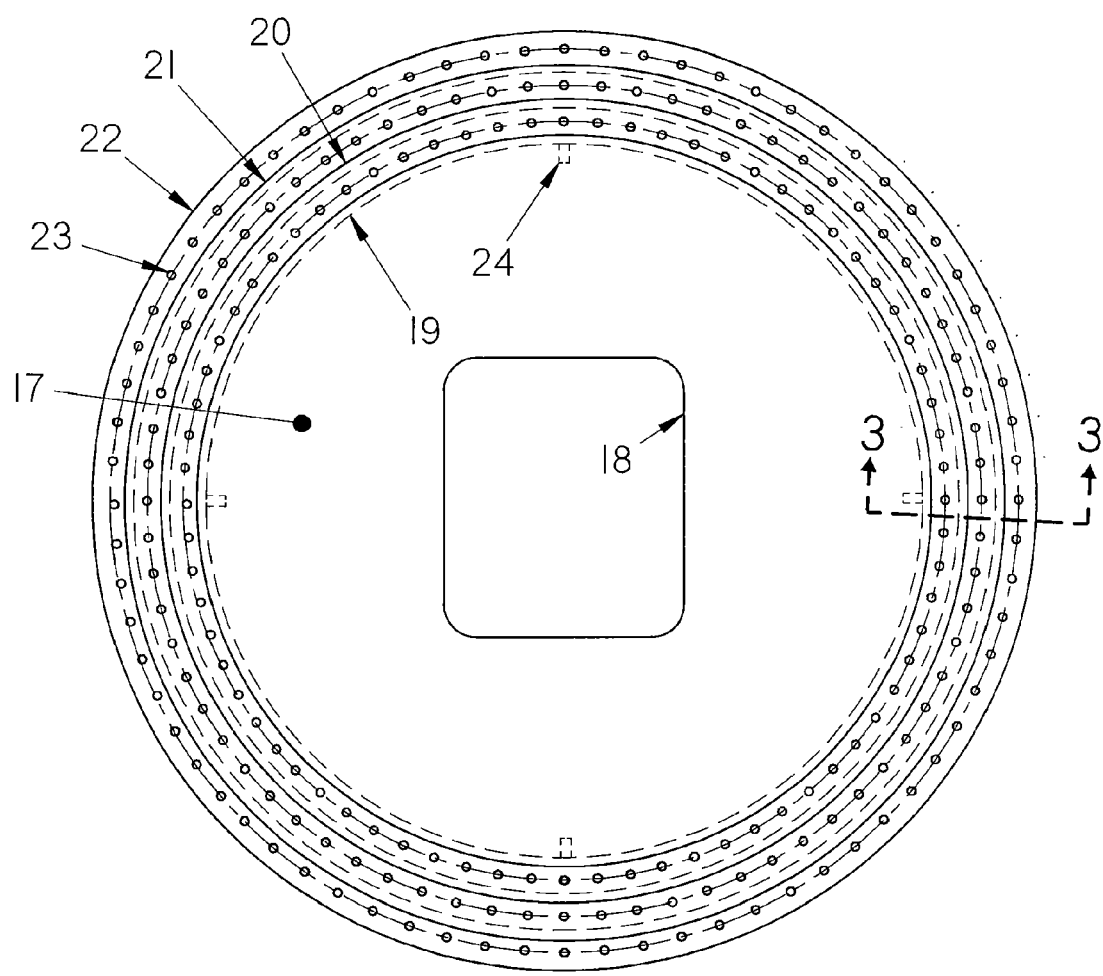
FIG. 2 is a cross-sectional view taken along line 2-2 of FIG. 1A looking down onto the tops of three nested tower sections in a retracted or collapsed orientation.

FIG. 2 is a top view of the tower T in the collapsed or retracted conformation taken along line 2-2 of FIG. 1A showing some of the flanges that are provided in the embodiments on the upper and lower portions of each tower section 1, 2, 3 for the purpose of securely fastening the tower sections with each other on end to form a stiff erected tower T whereupon the pressurized source of fluid maybe removed or otherwise permitted to escape from within the space collectively defined by the tower sections. A load support plate 17 with the access hole 18 represents a typical top portion of the tower to which a load such as the nacelle 6 is mounted. The inner wall 19 of the top section 3 of the tower is not directly visible in the illustrated cross-sectional view and is represented by the dashed line indicating a hidden surface. An outer edge 20 of the upper flange of the intermediate tower section 2 is illustrated and is disposed in the position shown, an outer edge 21 of the upper flange on the bottom section 1 is illustrated and is disposed in the position shown, and an outer edge 22 of the lower flange of the bottom section 1 is illustrated and is disposed in the position shown. The outer edge 22 of the lower flange is configured to be fastened, bolted or in any other way desired secured to the associated tower foundation 4. Each flange has numerous holes 23 for securing to the foundation 4 or so the flanges can be conveniently and easily bolted together to rigidly and securely connect sections of the tower together after they are fully extended relative to each other. The sections are prevented from rotating relative to each other by at least one rack bar 24 which is configured to slide into a notch suitably provided in each of the lower flanges on all of the sections except the bottom section 1.

Figure 3:
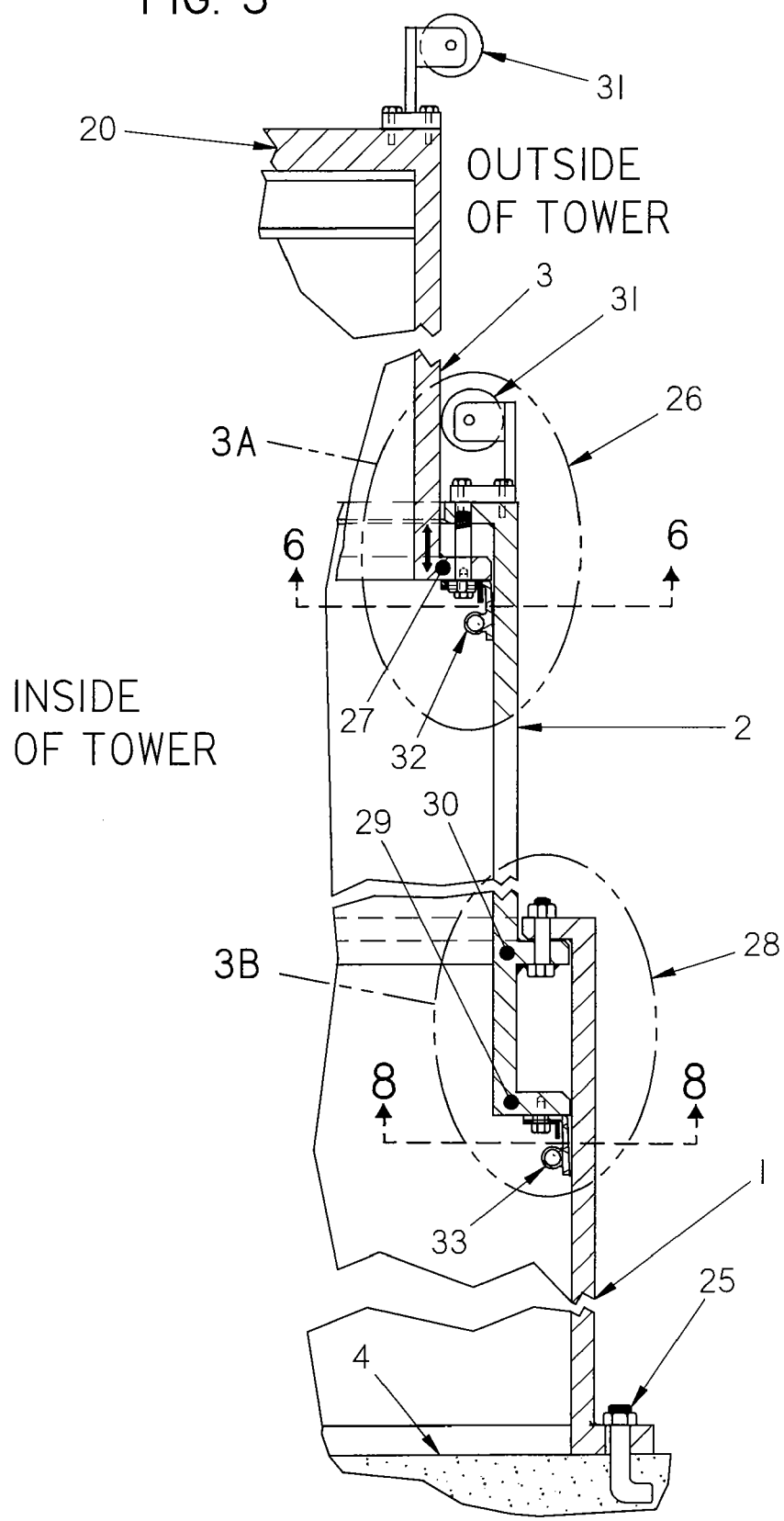
FIG. 3, is a cross-sectional view of the tower taken through line 3-3 of FIG. 2.

FIG. 3 is a cross sectional view of the collapsed nested tower sections taken along line 3-3 of FIG. 2. With reference now to that FIGURE, a typical preferred shape of each one of the three sections 1, 2, and 3 of the tower is illustrated, from the top to bottom. This view also illustrates a preferred means of securing the tower to the associated foundation 4, such as preferably by using anchor bolts 25. Tower portion 26 shows one preferred type of construction in which only a single flange 27 is on the lower end of a section 3 that slides upward when the tower is extended during the erection process. Tower portion 26 is presented more fully in an enlarged view in FIG. 3A. Tower portion 28 shows a preferred type of construction, in which two outwardly extending flanges 29 and 30 provided on the lower end of a section are configured to slide upwardly together with the section 2 when the tower T is extended. The lowermost of these two flanges 29 is in a preferred form typically several or more feet from the one above it 30, which ensures good sideways stability of the section as it approaches the point of being fully extended relative to the section within which it is moving. Tower portion 28 is presented more fully in an enlarged view in FIG. 3B.

FIG. 3 also shows guide member means in the preferred form of guide rollers 31, which are helpful when the sections are to be guided down into position over each other during the nesting, or stacking, procedure and under some circumstances during the erection process. It is to be appreciated, however, that the guide member means are not essential but would be typically used for convenience and to ease assembly and erection. For nesting or stacking these rollers are typically faced outward and temporarily installed on each section other than the bottom one 1, where they would have no use. When used during the erection process the guide member means are oriented to face and contact the opposed section that is moving relative to the guide member means and to provide more sideways stability. As an alternative to the rollers illustrated, the guide member means may comprise a bent plate made of steel or some other material, or an air bearing, which can be substituted to accomplish the same purposes as the guide rollers. During use, after the sections are nested, the guide rollers or guide plates can be removed as necessary or desired unless they are needed to provide stability during the erection process.

As previously mentioned, in accordance with the example embodiments, the actual nesting can be accomplished in several different ways, including but not limited to (a) setting the tower sections in place by sequentially lowering the sections down over each other with a large truck crane, or (b) nesting the tower sections inside each other while they are laying horizontally on the ground and then tipping them up on end all together at the same time. In accordance with a further embodiment, the tower sections may be delivered to the job or erection site as longitudinal full-length subassemblies, set on end in the proper sequence around each other and then joined together by bolting or welding. In any case it is not necessary to have the bottom of any of the tower sections hinged in order to lift them from the horizontal position to a vertical position. Properly designed relatively light weight lifting and handling fixtures and a light weight crane with adequate capacity are useful for erecting the subject tower T without the need for additional heavy duty equipment.

In the FIGURES, particularly FIG. 3 it can be seen that the outside diameter of the flange or flanges at the bottom end of the top section 3 and the intermediate section 2 is just slightly smaller than the inside diameter of the section immediately below it, in which it slides. This difference in diameter provides enough clearance to permit one section to slide freely inside the other. FIG. 3 also shows that the inside surface, or the bore, of the bottom section 1 and the intermediate section 2 is preferably maintained free and clear of objects or the like that would project inwardly relative to the outside walls of the tower and hit, obstruct, or otherwise interfere with the movement of the lower flange of the section immediately above it. It is to be appreciated that equipment and hardware can be attached at any time, however, to the inside of the uppermost section 3 and to the inside of any other section after the section immediately above it has been fully extended and secured in place.

The figure also shows the location of plural fluid barriers in the form of two different fluid seals 32 and 33 both of which prevent or minimize the amount of fluid passing through the space between the outer surface of the lowermost flanges of a section and the bore of the section immediately below.

FIG. 3A shows an enlarged portion 26 of FIG. 3, illustrating the details of construction of an embodiment of the subject tower when only a single flange 27 is provided on the lower end of a moving section. In that FIGURE, the top section 3 is, as shown, almost, but not quite, fully extended relative to the intermediate section 2 immediately below it. At this point of movement a centering ring 34 on the outside of the lower portion of the top tower 3 has engaged and slid inside of the inside diameter 35 of the upper flange 20 of the intermediate section 2, with chamfered corners 36, 37 and 38 on the centering ring and flange, respectively, guiding the centering ring into place within the inside diameter of the flange. This, in combination with the positioning control provided by the rack bars 24 (shown in FIG. 2), ensures that the threaded end of the large bolts 39 used to secure the sections together, will be correctly positioned to enter the holes 40 through which they go as the top section 3 moves upward until it is full extended relative to section 2. The heads 41 of the bolts are typically welded to the flange 27 to make it unnecessary for any workers to be inside the tower in order to install nuts on the bolts while the two tower sections are being connected together. The centering ring is not shown in FIG. 3 because of the level of detail selected to be presented. The centering ring would typically be constructed by depositing an appropriate weld overlay on the outside surface of section 3 and the overlay would be machined as necessary to generate the centering ring with the desired shape and dimensions.

The outside diameter 42 of the flange 27 at the lower end of section 3 is just slightly smaller than the inside diameter 43 of the inner wall of the intermediate tower 2. The difference in diameter is only enough to provide sufficient clearance for one section to slide freely inside the other. The combination of the close fit between flange 27 and the inner wall 43, and the close fit between flange 20 and the centering ring 34 helps maintain the tower sections in axial alignment and stable relative to each other as section 3 travels to the point of being fully extended relative to section 2.

In the example embodiment of the fluid-actuated telescoping tower as described herein and as shown in FIG. 3A, a fluid seal 32 is installed on the underside of flange 27, to ensure that little or no compressed fluid escapes from within the tower through the gap between the flange of one section and the side wall of another with which there is relative motion, such as the gap between flange 27 of section 3 and the inside wall 43 of section 2. A tube-like element 44 is attached to, or built into, the flat part of the seal as shown, and then filled with compressed fluid during the time the section is being extended so the tube-like element expands similar to a bicycle inner tube and pushes the flat part of the seal tightly up against the inside wall of the section it is sliding over.

FIG. 3A also shows the manner in which the fluid seal 32 is typically installed to ensure that little or no compressed fluid escapes from within the tower through the gap between the flange of one section and the side wall of another with which there is relative motion, such as the gap between flange 27 of section 3 and the inside wall 43 of section 2. In an embodiment, one method of urging the flat part of the seal to stay tightly up against the inside wall of the section it is sliding over is to have a tube-like element 44 attached to, or built into, the seal flap as shown, and then filling this tube-like element 44 with compressed fluid so it expands similar to a bicycle inner tube. In a further embodiment, the subject tower is built or otherwise constructed without such seals provided care is taken to construct it such that the gaps beside the outside diameters of the lower flanges of the intermediate and upper tower sections and any other potential leak paths are tight enough to prevent compressed fluid from escaping from the tower as fast as it is being put into the tower, but the preferred embodiment utilizes seals such as 32 and 33.

The fluid seal 32 can be attached to the lower surface of flange 27 by sandwiching it between the flange surface and a sufficiently stiff seal retaining ring 45, typically made of steel and secured to the flange by bolts 46 screwed into threaded holes in the flange. Typical bolt locations and the shape of a typical seal-retaining ring are illustrated in cross-section as shown best in FIG. 6.

Figure 3B:
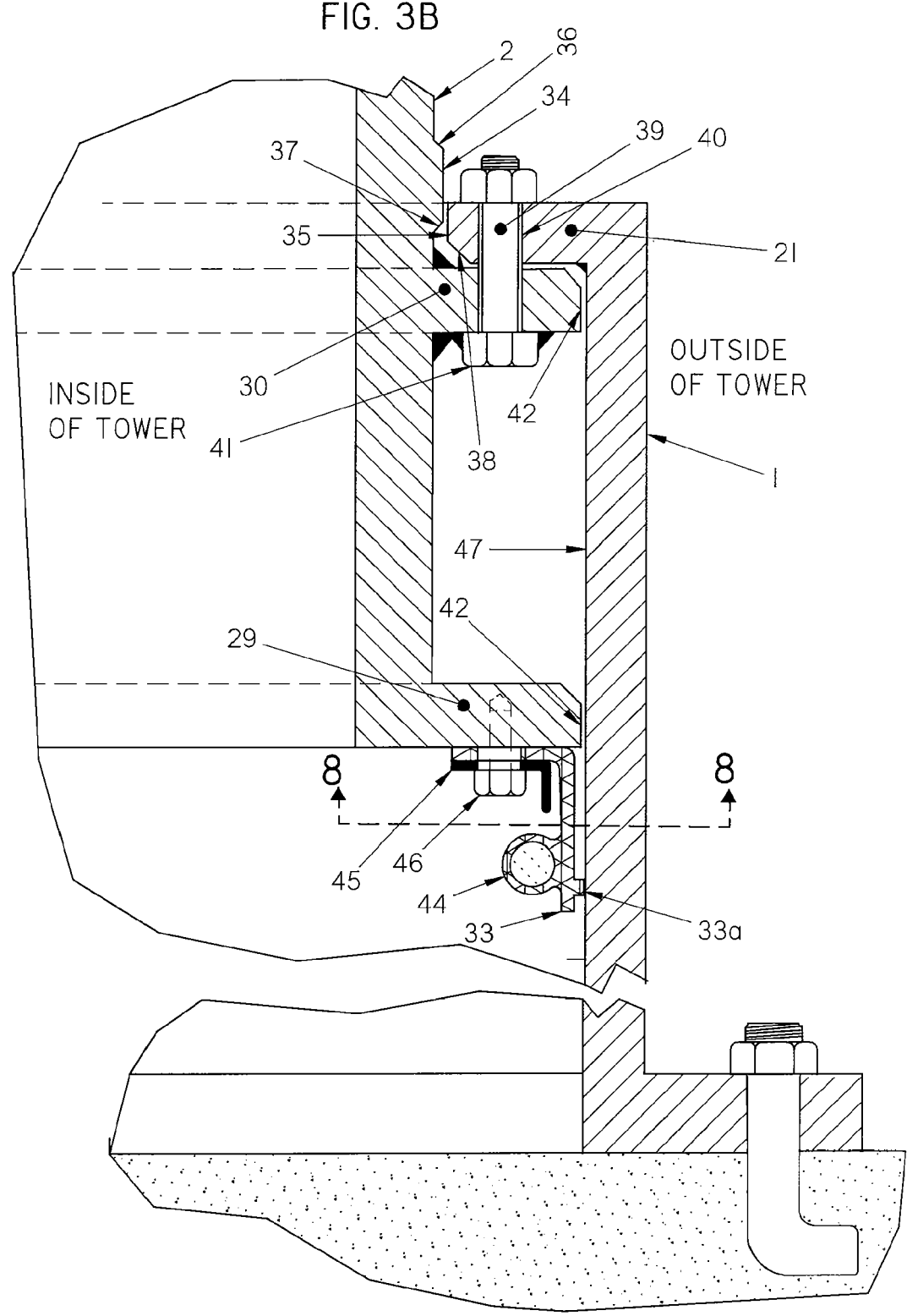

FIG. 3B is an illustration of an enlarged portion 28 of FIG. 3 showing details of construction of a further embodiment of the tower wherein the moving tower sections 2 and 3 both have an extended bottom and two flanges 29 and 30 are on the lower ends of each of the moving sections. This embodiment of the subject tower provides additional lateral stability to a section such as section 2 when it is being extended and approaching the point of being fully extended relative to another, such as section 1.

The construction of the tower with sections having extended bottoms is generally similar to the construction of a tower when only one flange is on the lower end of a moving section, in that a centering ring 34 is still typically utilized to center section 2 relative to section 1, said ring being guided into position inside the surface 35 of flange 21 by chamfered surfaces 36, 37 and 38 to ensure the proper alignment of the threaded end 39 of the large bolts 41 that go through the holes 40 in flanges 21 and 30 and by which the sections of the tower are secured in place, one to another. The heads of the large bolts 41 are welded to the underside of flange 30 to facilitate installing and tightening the nuts from the outside without any workers having to be inside the tower before all sections are fully extended and securely connected together.

The outside diameters 42 of the two flanges 29 and 30 at the lower end of section 2 are just slightly smaller than the inside diameter of the inner wall 47 of the bottom tower 1. The difference in diameters is only enough to provide sufficient clearance for section 2 to slide freely inside section 1. The combination of the close fit between the two flanges 29 and 30 and the inner wall, and the close fit between flange 21 and the centering ring 34 helps maintain the tower sections in axial alignment and stable relative to each other as section 2 travels to the point of being fully extended relative to section 1

In the example embodiment of the tower of this invention described herein, a fluid seal 33 is installed on the underside of flange 29, the lower of the two lowest flanges on moving sections with extended bottoms, to ensure that little or no compressed fluid escapes from within the tower through the gap between the flange of one section and the side wall of another with which there is relative motion, such as the gap between flange 29 of section 2 and the inside wall 47 of section 1. A tube-like element 44 is attached to, or built into, the flat part of the seal as shown, and then filled with compressed fluid during the time the section is being extended so the tube-like element expands similar to a bicycle inner tube and pushes the flat part of the seal tightly up against the inside wall of the section it is sliding over. It is to be appreciated that, preferably, the outside surface of seal 33 has a small built-up ring-like portion 33a that protrudes outward a short distance of approximately ⅜-inch. The outside surface of this small ring-like portion is the only part of seal 33 to contact the inside wall 47 of section 1, which reduces the static and dynamic friction forces which have to be overcome as the tower sections move relative to each other. Although the preferred embodiment of the seals is as described, it is to be appreciated that other equivalent alternatives are possible and that the described embodiments are not meant to limit the range of equivalents.

The fluid seal 33 is suitably attached with the flange 29 by sandwiching it between the flange surface and a sufficiently stiff seal-retaining ring 45, typically made of steel and secured to the flange by bolts 46 screwed into threaded holes in the flange. Typical bolt locations and a preferred shape of a seal-retaining ring are illustrated in cross-section 8-8 shown in FIG. 8, and located as shown in FIGS. 3 and 3B. Although the tower of this embodiment could be built without such seals, provided care is taken to construct it such that the gaps beside the outside diameters of the lower flanges of the intermediate and upper tower sections and any other potential leak paths are tight enough to prevent compressed fluid from escaping from the tower as fast as it is being put into the tower, the example embodiment has such fluid seals to minimize the amount of compressed fluid required to fully extend the tower.

FIG. 4 shows a section hold-down fixture 48 that can be used to prevent one or more sections of the tower from starting to travel upward before such travel is desired. Two to four such fixtures are attached by bolts or welding at or near the bottom of the inside surface of the bottom tower section 1. The hold-down fixture is constructed so it can also be bolted to the bottom inside surfaces of those sections of the tower that eventually get extended when the tower is erected, such as section 2 for the preferred embodiment, and also section 3 if the tower were comprised of four sections.

For the tower of the preferred embodiment comprising three sections, the hold-down fixture 48 is used to selectively prevent section 2 from traveling upward until section 3 was fully elevated and securely connected by bolting to the top of section 2. The compressed fluid within the tower is then selectively released and workers would thereafter be enabled to enter the tower, unbolt the hold-down fixtures from section 2 and exit the tower. This releasing action could also be accomplished by an associated remotely actuated device that would make it unnecessary to depressurize the tower so workers could enter. Compressed fluid would then again be pumped into the tower from the associated source until the fluid pressure in the tower was sufficient to elevate sections 2 and 3 and the load attached to section 3 consisting of the nacelle 5, hub 6 and blades 7. When section 2 becomes fully extended it is securely connected to section 1, the compressed fluid is then released from the inside of the tower, and the erection of the tower is completed other than possible incidental details.

FIG. 5 shows a cross-sectional view of the tower T taken through line 5-5 of FIG. 1B. This view shows a preferred set of holes 23 and 40 in an embodiment drilled into the flanges of each section of the tower for the large bolts used to anchor the tower to the associated foundation 4 and to connect tower sections together, and portion 49 shows the location of four notches 50 cut in all of the lower flanges of moving sections of the tower, such as in flange 30. The four notches are preferably 90 degrees apart from one another and each one provides clearance for a rack bar 51 that is part of a rack and pawl ratcheting mechanism which prevents a partially elevated tower section from sliding downward in the event of a loss or drop of fluid pressure during the erection process. The portion 49 also shows the preferred location and some structural aspects of the rack and pawl mechanism.

Figure 6:
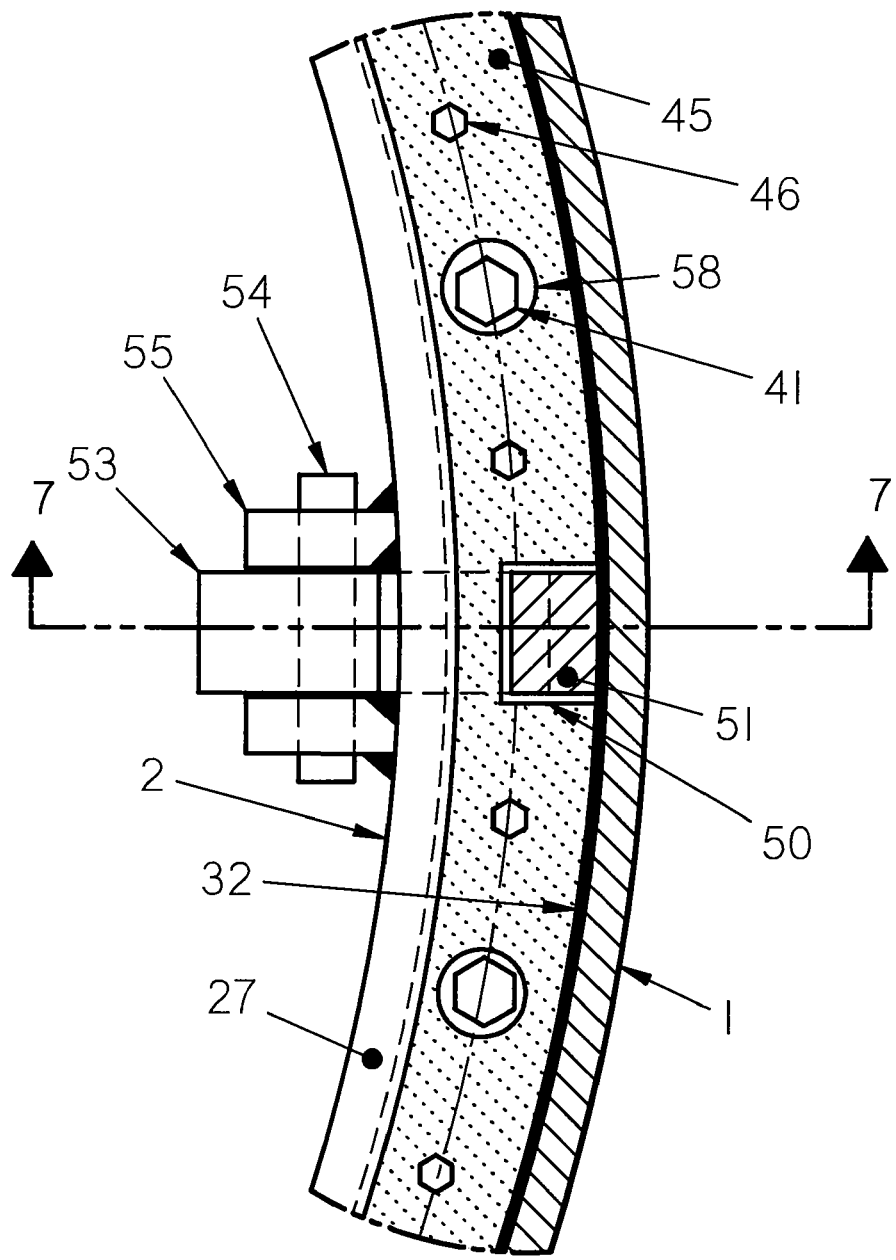
FIG. 6 is an enlarged portion of FIG. 5 showing bolt hole locations for flange-to-flange connections, elements of an anti-reversing rack and pawl system, and means for securing a fluid seal in place under one of the lower flanges of a tower section in accordance with the example embodiments.

FIG. 6 is a view from underneath the lower flange 27 of section 3 taken through line 6-6 of FIG. 3 showing the rack and pawl ratcheting mechanism in accordance with an embodiment, and it also shows the lower surface of flange 27 and a notch 50 for the rack and pawl mechanism 51, 53, 54 and 55. Also shown are the fluid seal 32, the fluid seal retaining ring 45 with clearance holes 58 in it for the bolts 41 that connect the tower section flanges together and the bolts 46 that secure the retaining ring to the underside of the flange 27. This figure illustrates how these components are typically arranged if the tower sections do not have an extended bottom as shown in FIG. 3B.

Figure 7:
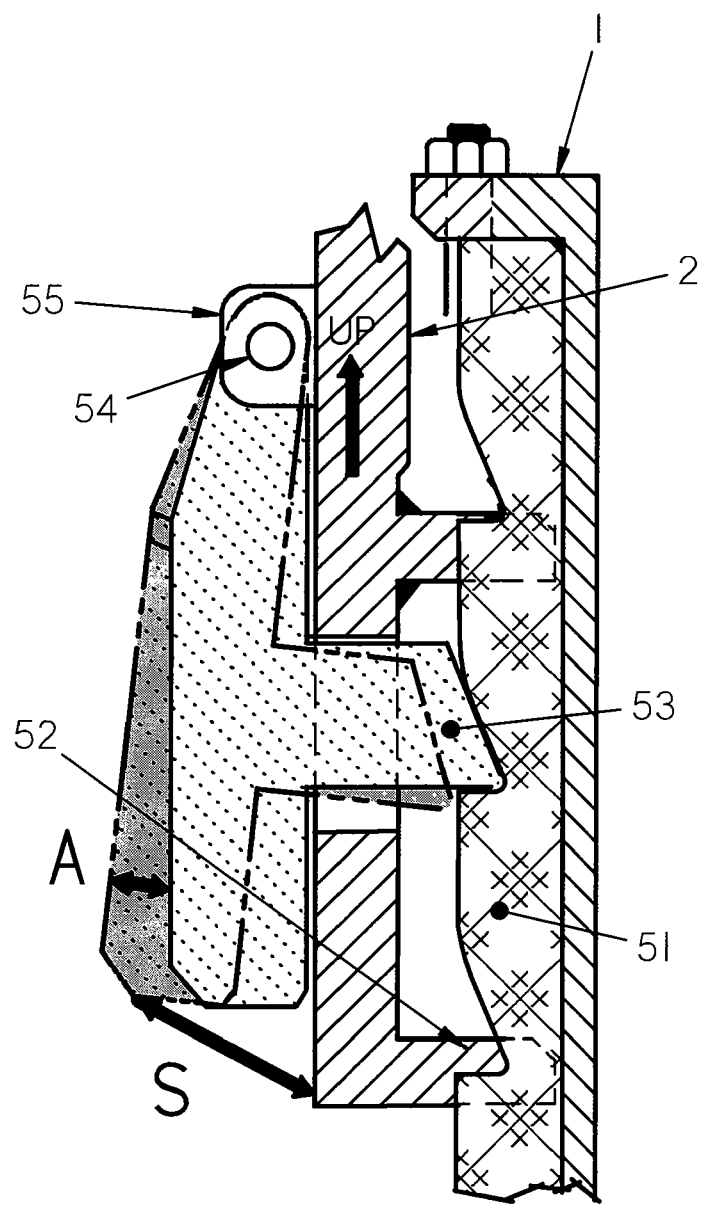
FIG. 7 is a cross-sectional view of the tower taken through line 7-7 of FIGS. 6 and 3A showing elements of the rack and pawl system.

FIG. 7 is a cross-sectional view taken through line 7-7 of FIG. 6 and shows the rack and pawl mechanism as seen looking from the side, with the mechanism in cross section. The rack bar 51 is secured, typically by welding, to the inside of the side wall of a tower section such as section 1. The rack bar has numerous notches 52 cut into one side with all the notches approximately the same distance from one another, typically on approximately 12 inch centers. The notches are shaped so the pawl can easily move in an upward direction over the notch but if the pawl starts to travel downward the notch catches it and prevents any further downward movement.

In this illustration an intermediate tower section 2 has been elevated almost all the way with respect to lower tower section 1, and the pawl 53 is shown engaged in one of the notches in the rack bar. When the pawl is engaged in the notch no downward movement can occur, but the pawl can travel in an upward direction with tower section 2, to which it is attached by pivot pin 54 and the two lugs 55 that are welded to the inside wall of intermediate tower section 2. As the pawl travels upward it is free to rotate on the pivot pin 54 so the part of the pawl that was engaged in the notch can simply slide freely up the slanted portion of the notch. The position of the pawl when it has swung out of the notch is shown by the darker profile A. The pawl is preferably shaped so any time it starts to travel in a downward direction its own weight and the force of gravity cause it to swing down into the first notch it comes to, which immediately stops and prevents any further downward movement. Typically, a biasing means such as, for example, a spring represented by line S is also attached to the pawl to supplement the force of gravity and ensure the pawl will quickly and fully enter into a notch as soon as any downward travel starts to occur. If downward travel is actually desired a means must be provided to prevent the pawl from entering the notch. For the preferred embodiment of this invention this means would be a remotely controlled fluid cylinder in the same general area as spring S or any other device suitable for selectively moving the pawl away from the notch.

Figure 8:
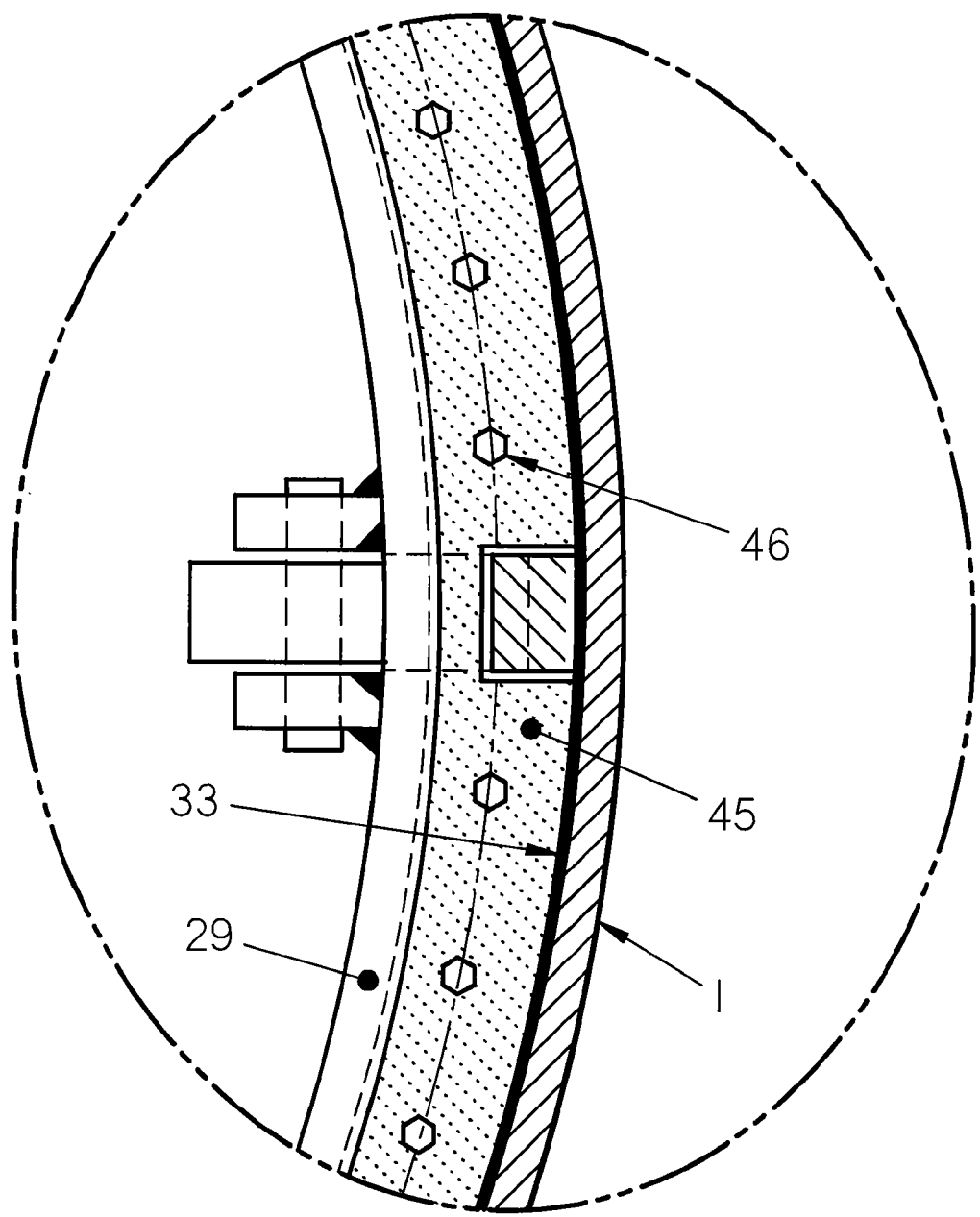
FIG. 8 is a cross-sectional view of the tower taken through line 8-8 of FIG. 3 showing a rack and pawl system and means for securing a fluid seal in place under one of the lower flanges of a tower section.

FIG. 8 is a close-up cross-sectional view taken along line 8-8 of FIG. 3B looking vertically upwardly through a sidewall of bottom tower section 1. FIG. 8 shows the lower surface of the bottom flange 29, with a notch for the rack and pawl mechanism, the fluid seal 33, the fluid seal retaining ring 45 and the bolts 46 that secure the retaining ring to the underside of the flange 29. This figure illustrates how these components are preferably arranged when the tower sections have an extended bottom, as in the example embodiment of the invention disclosed herein, and as shown in FIG. 3B.

It is to be appreciated that while the tower sections 1, 2 and 3 as described herein are essentially circular cylinders other tubular shapes could be used for the towers of this invention, such as triangular, square of octagonal.

Figure 9:
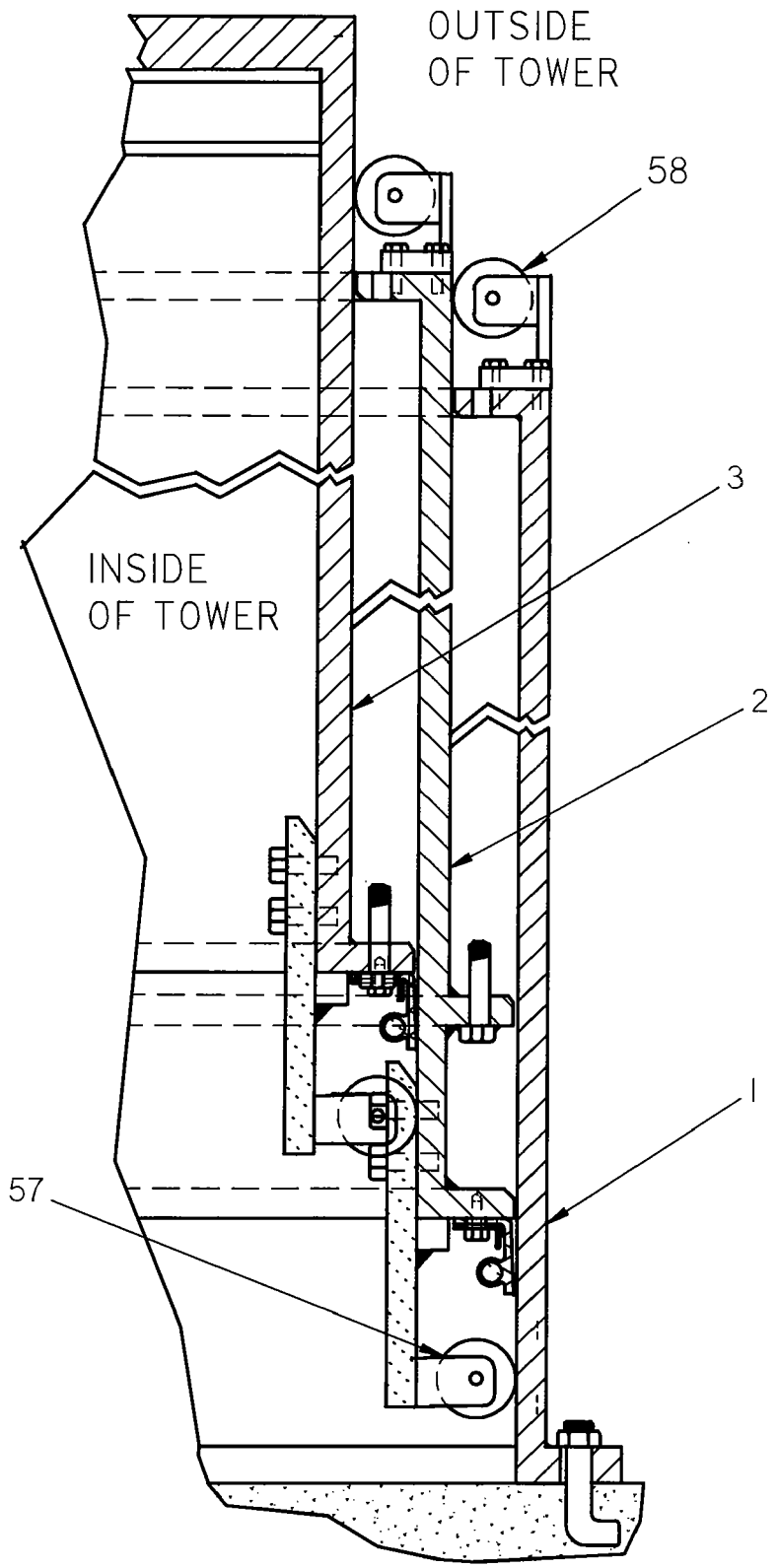
FIG. 9 is a cross-sectional view of portions of the tower in accordance with a further embodiment.

FIG. 9 illustrates a preferred manner in which either internal 57 or external 58 guide rollers, or both types, can be utilized to provide additional sideways stability to minimize the side sway of tower sections 2 and 3 as they are being extended and approaching the point of full extension. To be effective at least 3 and preferably 4 wheels would be used and approximately equally spaced circumferentially at the top of, or inside of, a section. In this embodiment, the internal and external guide rollers or wheels can be attached to the various sections of the tower to guide the sections into and out of each other, and to give a section nearing full extension supplemental lateral stability. If desired, either smooth plates or "shoes" that slide rather than roll over the various tower surfaces or air bearings can replace the rollers shown and provide approximately the same benefits as the rollers.

Figure 9A:
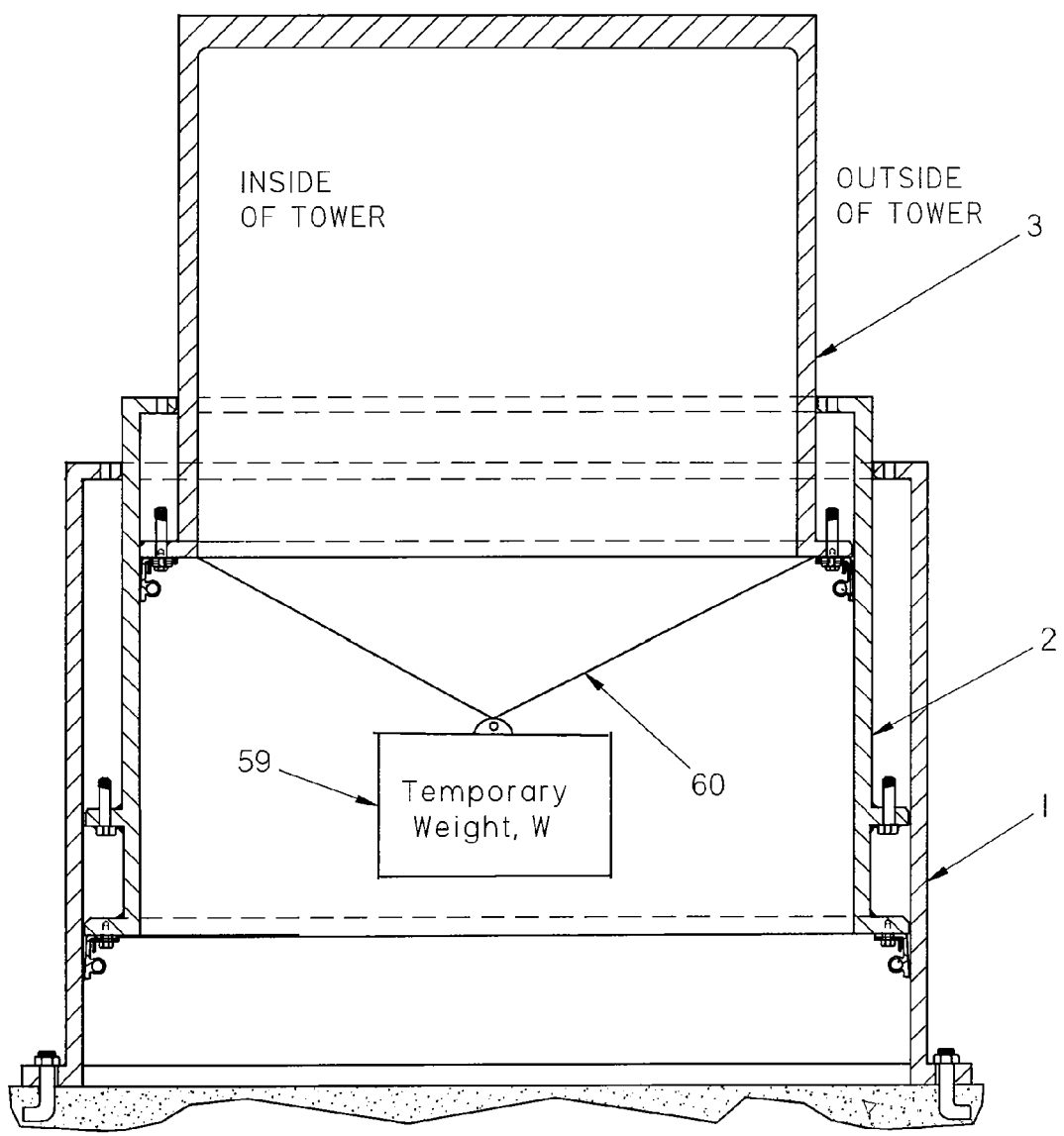
FIG. 9A is a cross-sectional view of portions of the tower in accordance with a further embodiment.

FIG. 9A illustrates a preferred manner in which temporary weights can be attached to the lower portion of a section while it is being extended in order to give the moving section more lateral stability as it nears the point of being fully extended relative to the section to which it will be attached. As shown, one or more temporary weights 59 are selectively secured by cables, chains, or other means such as rods or bars 60 to the lower portion of a section being extended with the result that the center of gravity of the section being extended is lowered, and if the top of the tower starts to move sideways in any direction, the effect of the temporary weight 59 is to oppose such movement because in order for such sideways movement to occur the temporary weight must be lifted up by the cables or other such means by which the weight is attached to the lower part of the section. The force required to lift the temporary weight effectively applies a torque to the tower section that opposes the sideways movement of the top.

Figure 10:
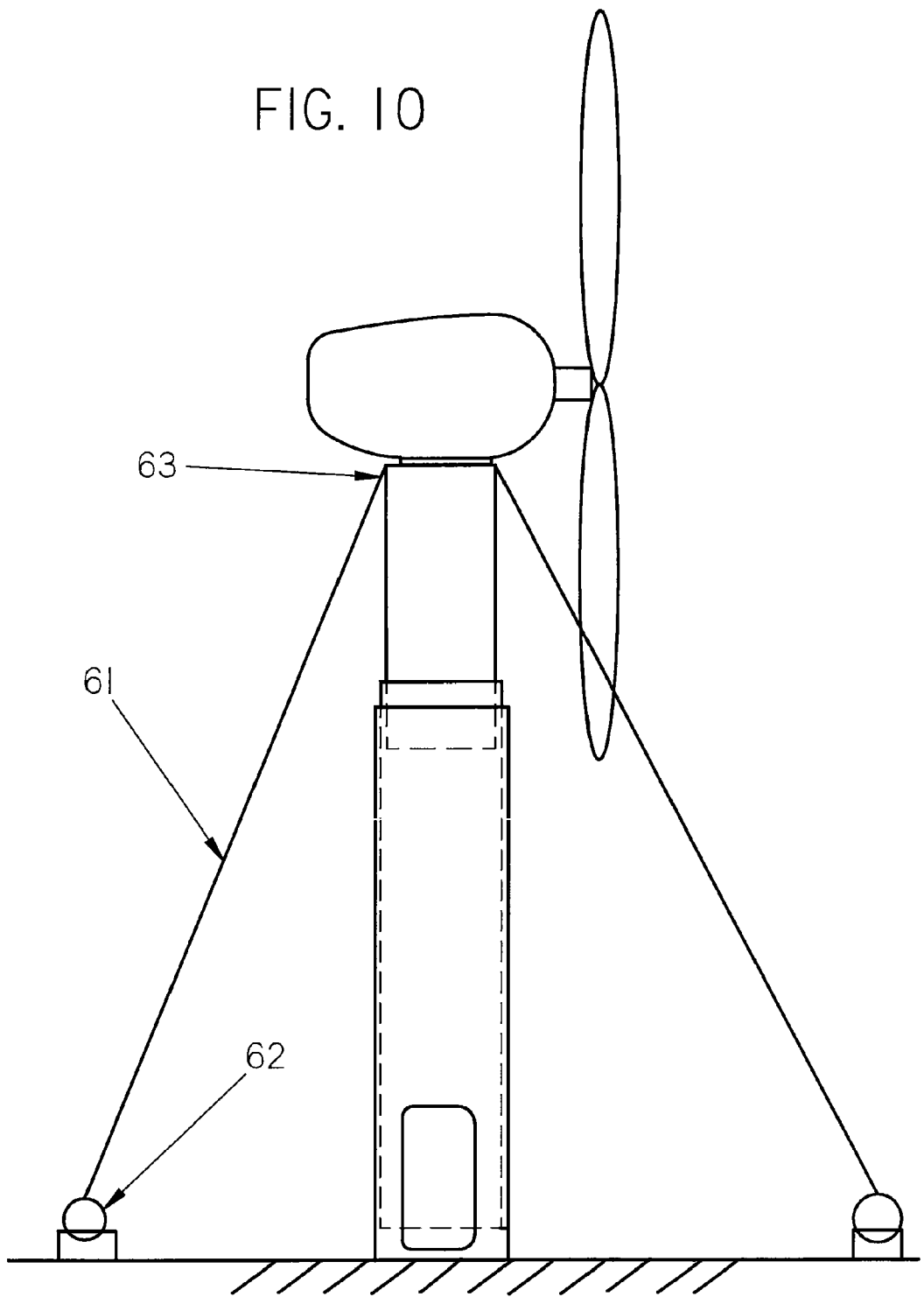
FIG. 10 is an elevational view of portions of the tower in accordance with a further embodiment.

FIG. 10 illustrates a preferred manner in which a group of winches that are fixed to the ground at three or more points around the base of the tower being used to provide extra lateral stability to a moving section nearing full extension, with the winches being controlled and coordinated such that cable is released from each one in a manner that results in the top of the section being extended staying plumb and stable throughout the extension process and until it is secured to the section below it. As shown, three or more guy wires 61 coming from ground-mounted winches 62 and attached to a clip 63 or some other type of device near, or at, the top of a tower section 3 that is being extended can be utilized to provide additional sideways stability to minimize the side sway of that section. To be most effective at least 3 and preferably 4 guy wires and winches should be used, and the winches should be such that they can "play out" or unwind cable at a rate that coordinates with the upward movement of the tower section to which they are attached. The winches should also be about equally spaced circumferentially around the tower.

Figure 11A:
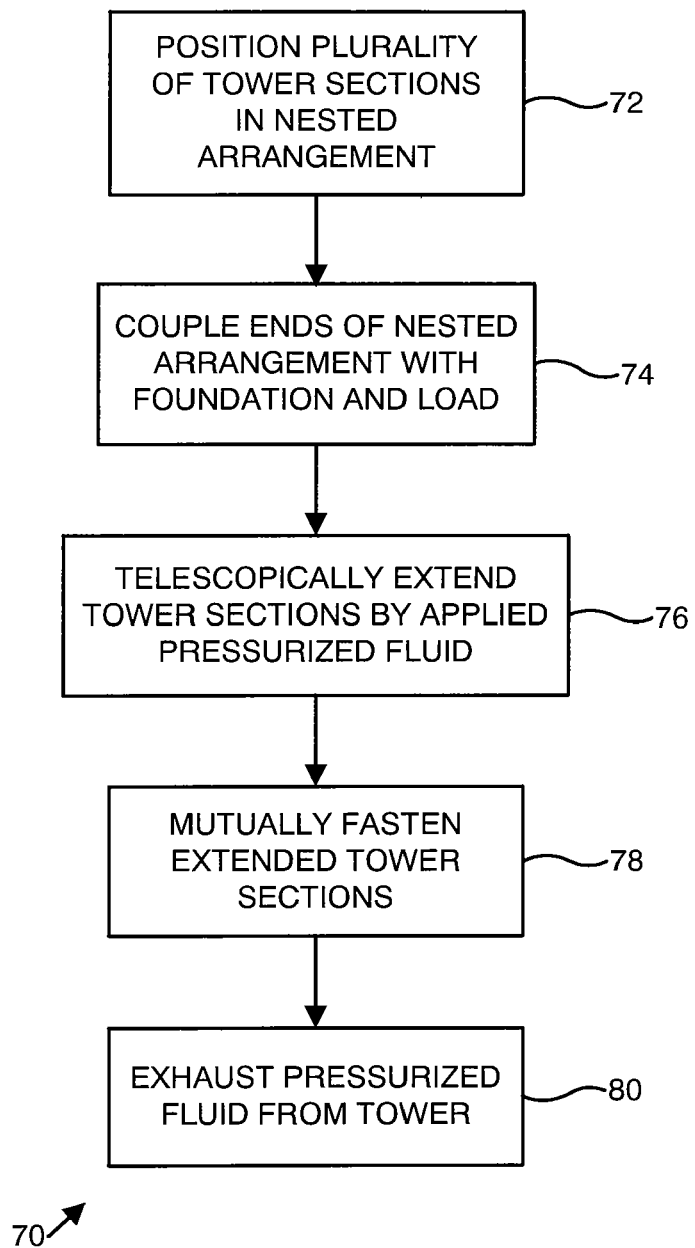
FIG. 11A is a flow diagram illustrating a method of erecting a telescoping tower in accordance with a further embodiment; and, FIG. 11B is a flow diagram illustrating a method of collapsing a previously erected telescoping tower in accordance with a further embodiment.

FIG. 11A is a flow diagram illustrating a method 70 of erecting a telescoping tower structure for supporting an associated load operatively coupled with a first end of the tower structure at a selected vertical height above an associated tower foundation operatively coupled with a second end of the tower structure opposite from the first end, in accordance with a further embodiment. With reference now to that FIGURE, in step 72, a plurality of tower sections are disposed in a nested arrangement. The step preferably includes, for example, disposing a plurality of tower structure sections in a retracted nested arrangement wherein central longitudinal axes defined by the plurality of tower structure sections are substantially mutually coextensive. In step 74, ends of the nested arrangement are coupled with the associated foundation and with the associated load. The step preferably includes, for example, coupling a first end of an outermost tower structure section of the retracted nested arrangement with the associated tower foundation in a vertical orientation, and coupling a first end of an innermost tower structure section of the retracted nested arrangement with the associated load. In step 76, the nested tower sections are telescopically extended by applied air pressure from an associated source. The step preferably includes, for example, receiving compressed fluid into the retracted nested arrangement, establishing relative vertical movement between the innermost and outermost tower structure sections by the compressed fluid thereby raising the associated load relative to the associated tower foundation, and arresting the relative vertical movement between the innermost and outermost tower structure sections at a selected relative extended position between the innermost and outermost tower structure sections. The relative vertical movement between the innermost and outermost tower structure sections is preferably arrested by mechanical interference between opposed flange members on respective ends of the innermost and outermost tower structure sections whereby vertical travel is limited to prevent the inner section from dislodging from the outer tower section under the influence of the compressed fluid. The fully extended tower sections are mutually fastened at step 78. The step preferably includes, for example, forming the plurality of tower structure sections in a first extended nested arrangement by rigidly coupling a second end of the innermost tower structure section opposite the first end with an end of a next inner tower structure section. Lastly, at step 80, the pressurized fluid contained within the tower is selectively exhausted from the tower, such as by opening one or more air or water valves, for example.

Figure 11B:
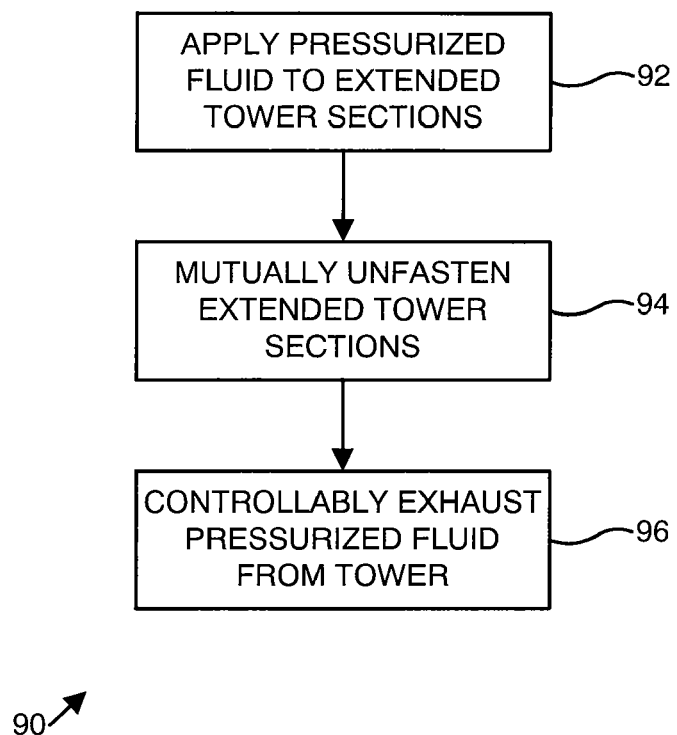

FIG. 11B is a flow diagram illustrating a method 90 of collapsing a previously erected telescoping tower in accordance with a further embodiment. With reference now to that FIGURE, pressurized fluid from an associated source is applied to the fully erected tower in step 92. The fluid may be gas, liquid, or a combination. In step 94, the fasteners mutually connecting the tower sections end to end are unfastened or otherwise released. In step 96, the pressurized fluid within the tower is released in a controlled manner permitting the tower sections to telescopically retract into a nested orientation.

The foregoing is considered as being to illustrate the principles of the invention, and it is not desired to limit the invention only to the construction, operation and methods described herein since numerous modifications and changes can be made by those skilled in the art, and therefore all suitable modifications and equivalents may be utilized, falling within the scope of the invention.

What is claimed is at least as follows:

1. A fluid-actuated telescoping tower for supporting an associated load at a selected height above an associated tower foundation, the tower comprising:
    a fluid barrier;
    a first tubular tower section selectively coupled on a closed fluid end thereof with the associated tower foundation;
    a second tubular tower section configured for selective coupling on a closed fluid end thereof with the associated load, the second tubular tower section being telescopically connected with the first tubular tower section forming a nested retracted arrangement oriented in a generally vertical position, the first and second tubular tower sections being mutually fluid-tight by the fluid barrier when so nested and throughout relative axial movement between the first and second tower sections between opposite retracted and extended positions;
    a fluid port configured to receive compressed fluid from an associated source of compressed fluid into an interior space of the tower defined by the first and second tubular sections thereby urging relative motion between the first and second sections from the retracted relative position to the extended relative position to effect relative vertical movement of the associated load relative to the associated foundation raising the associated load to the selected height; and,
    threaded fasteners selectively connectable with the first and second tubular sections disposed in the extended position, the fasteners mechanically mutually coupling the first and second tubular sections to hold the first and second tubular sections in the extended position with the compressed fluid exhausted from the interior space of the tower by the fluid port.

2. The tower according to claim 1, further comprising:
    one or more intermediate tubular tower sections telescopically received between the first and second tubular tower sections, the one or more intermediate tubular tower sections being mutually sealed by one or more fluid barriers when so received and throughout relative axial movement between the first, second and one or more tower sections between opposite retracted and extended positions of the fluid-actuated tower.

3. The tower according to claim 1, wherein the fluid barrier comprises:
    a circular fluid seal having a substantially flat surface configured to slide on an inside surface of a sidewall of the first tower section; and,
    biasing means selected from the group comprising an elongate compression spring or a hollow inflatable elastic tube operatively coupled with an inside surface of said flat surface for selectively applying radially directed pressure around said inside surface without interruption for ensuring a substantially fluid tight seal between the first and second tubular tower sections.

4. The tower according to claim 3, further comprising: radially extending flange members disposed on ends of the first and second tower sections, the flange members for adapting the tower sections to be selectively joined to each other by mutually fastening selected flanges together after they have come into abutting contact with each other with the first and second sections in the extended relative position.

5. The tower according to claim 4, further comprising: a centering ring at a bottom exterior of the inner tower section, the centering ring carrying a chamfered surface and being configured to be guided into the center of the inside diameter of the upper flange of the associated outer section by the chamfered surface for centering the inner section relative to the outer one and ensure proper bolt hole alignment.

6. The tower according to claim 1, further comprising: one or more rack bars attached to the inside of an outer tower section; and, one or more pawls attached to the associated inner tower section, the one or more rack bars and pawls being selectively mechanically engageable for selectively preventing the inner section from moving more than a predetermined distance downward responsive to a drop or loss of fluid pressure during the time the inner section is being extended or before the inner section can be securely connected to the associated outer section.

7. The tower according to claim 6, wherein the rack bars on the inside of the outer tower section pass through notches or slots in, or between two surfaces on, the lower outside part of the inner tower section, thereby preventing any rotation of one section relative to another and ensuring the proper alignment of any bolt holes for joining the two sections to each other.

8. The tower according to claim 1, further comprising: two or more hold-down fixtures are attached at approximately equal circumferential distances from each other to the lower inside surface of the sidewall of the bottom outermost section, or secured to the tower foundation, and then temporarily connected by bolts or some mechanical device to the bottom of one or more inner sections to hold said inner sections in place and ensure they will not move upward before such movement is desired.

9. The tower according to claim 1, wherein at least one of said tower sections includes guide rollers, smooth plates or air bearings to either guide the sections into proper position when one is being lowered down for nesting inside another, or to limit sideways movement of the top of an inner section as the inner section is being extended and nears a relative position of being fully extended relative to its corresponding outer section.

10. The tower according to claim 1, further comprising: a temporary weight attached at or near the bottom of a section being extended in order to give the section being extended greater lateral stability as the section being extended is moved to a point of being fully extended relative to the section within which the section being extended is moving.

11. The tower according to claim 1, further comprising: three or more guy wires extending from associated ground-mounted winches, the three or more guy wires being attached near a top portion of one or more tower sections and paid out or unwound in a controlled and coordinated manner in order to limit sideways movement of the top of an inner section as the inner section is being extended and approaching the point of full extension relative to a corresponding outer section receiving the inner section.

12. A tower according to claim 1, wherein one or more inner sections is constructed such that when an inner section is fully extended relative to an associated outer section, a significant portion of the inner section still remains inside the associated outer section, said portion having two typically circular flanges, the first being one that comes up against and bolts to what is typically a circular flange attached to the top of the associated outer section, and within which the inner section slides snugly but freely, while the second of the said two flanges is typically 12 or more inches below the upper one and constructed such that the inner section slides in a close but free fit within the sidewall of the associated outer section, with said 12-inch or more distance between the ring of support applied to the inner section by the flange at the top of the outer section and the ring of support applied to the outside diameter of the flange of the inner section by the sidewall of the outer section providing very good support for the inner section and ensuring that the top of said inner section will not sway excessively as the inner section approaches the point of being fully extended.

13. A method of erecting a telescoping tower structure for supporting an associated load operatively coupled with a first end of the tower structure at a selected vertical height above an associated tower foundation operatively coupled with a second end of the tower structure opposite from the first end, the method comprising:
disposing a plurality of tower structure sections in a retracted nested arrangement wherein central longitudinal axes defined by the plurality of tower structure sections are substantially mutually coextensive;
coupling a first end of an outermost tower structure section of the retracted nested arrangement with the associated tower foundation in a vertical orientation;
coupling a first end of an innermost tower structure section of the retracted nested arrangement with the associated load;
receiving compressed fluid into the retracted nested arrangement;
establishing relative vertical movement between the innermost and outermost tower structure sections by the compressed fluid thereby raising the associated load relative to the associated tower foundation;
arresting the relative vertical movement between the innermost and outermost tower structure sections at a selected relative extended position between the innermost and outermost tower structure sections;
forming the plurality of tower structure sections in a first extended nested arrangement by, using at least one fastener, mutually coupling a second end of the innermost tower structure section opposite the first end with an end of a next inner tower structure section;
exhausting the compressed fluid from the first extended nested arrangement; and
using the at least one fastener, holding the plurality of tower structure sections in the first extended nested arrangement with the compressed fluid exhausted from the extended nested arrangement.

14. The method according to claim 13, wherein the tower sections are selectively nestable, starting with the outermost and progressing to the innermost and then, after being nested, selectively connectable to associated lifting and handling fixtures and selectively oriented in a vertical position on the associated tower foundation, with the associated load being mounted to the top of the top section after the sections are all in place on the associated tower foundation.

15. A structure for supporting an associated load relative to an associated base member, the structure comprising:
a first cylindrical member defining a first space and being supported on a first end thereof by the associated base member;
a second cylindrical member having a first end telescopically connected with a second end of the first cylindrical member opposite the first end and defining a second space, the second cylindrical member being configured on a second end thereof to selectively couple with the associated load;
a fluid coupling configured to provide a fluid seal between the first and second cylinders;
a port on at least one of the first and second cylindrical members, the port being configured for communicating compressed fluid between an associated source of compressed fluid and the first and second spaces, whereby the second cylindrical member is selectively urged into telescopic movement between extended and retracted positions relative to the first cylindrical member by the associated compressed fluid; and,
a fastener interlock for selectively mutually coupling the second end of the first cylindrical member with the first end of the second cylindrical member thereby selectively fixing the second member in the extended position relative to the first cylindrical member.

16. The structure according to claim 15 further including:
a plurality of telescopic cylindrical members, each of the plurality of telescopic cylindrical members defining a corresponding plurality of spaces, wherein the fluid coupling is configured to provide a fluid tight coupling between the first, second, and plurality of cylinders;
wherein the port is configured for communicating compressed fluid between an associated source of compressed fluid and the first and second spaces, whereby the second cylindrical member is selectively urged into telescopic movement between extended and retracted positions relative to the first cylindrical member; and,
wherein the fastener interlock is configured for selectively fixing the plurality of cylindrical members including the first and second cylindrical members in an extended position relative to the associated base members.

17. A method of extending a structure including a first cylindrical member defining a first space and being supported on a first end thereof by the associated base member; a second cylindrical member having a first end telescopically connected with a second end of the first cylindrical member opposite the first end of the first cylindrical member and defining a second space, the second cylindrical member being configured on a second end thereof to selectively couple with the associated load; a fluid coupling configured to provide a fluid tight coupling between the first and second cylinders; a port on at least one of the first and second cylindrical members, the port being configured for communicating compressed fluid between an associated source of compressed fluid and the first and second spaces, whereby the second cylindrical member is selectively urged into telescopic movement between extended and retracted positions relative to the first cylindrical member, the method comprising:
filling the first and second spaces with compressed fluid;
using one or more fastener interlocks, mutually coupling the second end of the first cylindrical member with the first end of the second cylindrical member thereby selectively fixing the first and second cylindrical members in the extended position using the fastener interlocks; and,
releasing the compressed fluid from the first and second spaces.

18. The method of extending a structure according to claim 17 further comprising applying the fixing, filling, fixing, and releasing steps to a structure having a plurality of telescopic cylindrical members.

19. A method of controlled collapsing a structure including a first cylindrical member defining a first space and being supported on a first end thereof by the associated base member, a second cylindrical member having a first end telescopically connected with a second end of the first cylindrical member opposite the first end of the first cylindrical member and defining a second space, the second cylindrical member being configured on a second end thereof to selectively couple with the associated load; a fluid coupling configured to provide a fluid tight coupling between the first and second cylinders; a port on at least one of the first and second cylindrical members, the port being configured for communicating compressed fluid between an associated source of compressed fluid and the first and second spaces, whereby the second cylindrical member is selectively urged into telescopic movement between extended and retracted positions relative to the first cylindrical member; and, a fastener interlock selectively mutually coupling the second end of the first cylindrical member with the first end of the second cylindrical member thereby selectively fixing the second member in the extended position relative to the first cylindrical member, the method comprising:
filling the first and second spaces with compressed fluid;
freeing movement between the first and second cylindrical members in the extended position by releasing or removing the fastener interlock to decouple the first and second cylindrical members; and,
controlledly releasing the compressed fluid from the first and second spaces.

20. The method of controlled collapsing a structure according to claim 19 further comprising applying the filling, freeing and releasing steps to a structure having a plurality of telescopic cylindrical members.

* * * * *